(12) United States Patent
Goffe

(10) Patent No.: US 9,757,691 B2
(45) Date of Patent: Sep. 12, 2017

(54) HIGH EFFICIENCY AND DURABILITY SELECTIVE CATALYTIC REDUCTION CATALYST

(71) Applicant: Randal A. Goffe, Everett, WA (US)

(72) Inventor: Randal A. Goffe, Everett, WA (US)

(73) Assignee: PACCAR Inc, Bellevue, WA (US)

( * ) Notice: Subject to any disclaimer, the term of this patent is extended or adjusted under 35 U.S.C. 154(b) by 17 days.

(21) Appl. No.: 14/935,048

(22) Filed: Nov. 6, 2015

(65) Prior Publication Data

US 2017/0128883 A1 May 11, 2017

(51) Int. Cl.
*B01D 53/56* (2006.01)
*B01D 53/94* (2006.01)
*B01J 23/00* (2006.01)
*B01J 29/04* (2006.01)
*B01J 21/06* (2006.01)
(Continued)

(52) U.S. Cl.
CPC ........ *B01D 53/9418* (2013.01); *B01J 21/066* (2013.01); *B01J 23/22* (2013.01); *B01J 29/061* (2013.01); *B01J 29/46* (2013.01); *B01J 29/7015* (2013.01); *B01D 2255/20715* (2013.01);
(Continued)

(58) Field of Classification Search
CPC ............ B01D 53/9418; B01D 2255/20; B01D 2255/20723; B01D 2255/50; B01D 2257/404; B01D 2258/012; F01N 3/2066; B01J 23/00; B01J 23/22; B01J 29/06; B01J 29/061
See application file for complete search history.

(56) References Cited

U.S. PATENT DOCUMENTS 3,730,391 A 5/1973 Lang et al.
4,929,581 A 5/1990 Steinwandel et al.
(Continued)

FOREIGN PATENT DOCUMENTS

CN 105363497 A * 3/2016 ............. B01J 37/04
EP 1945356 A1 9/2012
(Continued)

OTHER PUBLICATIONS

Conway, R., et al., "Demonstration of SCR on a Diesel Particulate Filter System on a Heavy Duty Application," SAE Technical Paper 2015-01-1033, Apr. 14, 2015, Abstract.
(Continued)

*Primary Examiner* — Timothy Vanoy
(74) *Attorney, Agent, or Firm* — Christensen O'Connor Johnson Kindness PLLC; Juan Zheng; Llewellyn Lawson

(57) ABSTRACT

This disclosure features an exhaust aftertreatment system that includes a selective catalytic reduction catalyst that includes (1) a metal oxide catalyst and a metal zeolite catalyst, (2) a metal oxide catalyst that is other than a vanadium oxide catalyst and a vanadium oxide catalyst, or (3) a metal oxide catalyst that is other than a vanadium oxide catalyst together with a metal zeolite catalyst and a vanadium oxide catalyst. When used in a selective catalytic reduction system in a diesel engine, the catalyst composition can increase a conversion efficiency of nitrogen oxides (NOx) to nitrogen and water by a minimum of 2 percent compared to the metal zeolite catalyst alone, the metal oxide catalyst alone, or the vanadium oxide catalyst alone, when present.

25 Claims, 18 Drawing Sheets

(51) Int. Cl.
*B01J 29/46* (2006.01)
*B01J 29/06* (2006.01)
*B01J 29/70* (2006.01)
*B01J 23/22* (2006.01)

(52) U.S. Cl.
CPC .............. *B01D 2255/20723* (2013.01); *B01D 2255/50* (2013.01); *B01D 2255/504* (2013.01)

(56) References Cited

U.S. PATENT DOCUMENTS

| | | | |
|---|---|---|---|
| 5,149,512 A * | 9/1992 | Li ..................... | B01D 53/8625 423/212 |
| 6,475,944 B1 * | 11/2002 | Yang ................. | B01D 53/8628 423/239.1 |
| 6,826,906 B2 | 12/2004 | Kakwani et al. | |
| 7,078,004 B2 | 7/2006 | Voss et al. | |
| 7,229,597 B2 | 6/2007 | Patchett et al. | |
| 7,902,107 B2 | 3/2011 | Patchett et al. | |
| 7,998,423 B2 | 8/2011 | Boorse et al. | |
| 8,017,543 B2 | 9/2011 | Andy et al. | |
| 8,119,088 B2 | 2/2012 | Boorse et al. | |
| 2006/0057046 A1 | 3/2006 | Punke et al. | |
| 2010/0172828 A1 * | 7/2010 | Althoff ............. | B01D 53/9418 423/713 |
| 2010/0180580 A1 | 7/2010 | Boorse et al. | |
| 2011/0142737 A1 * | 6/2011 | Seyler ................ | B01D 53/9418 423/213.2 |
| 2011/0250114 A1 * | 10/2011 | Augustine .......... | B01D 53/8628 423/239.1 |
| 2012/0058034 A1 * | 3/2012 | Ogunwumi ........ | B01D 53/9418 423/239.2 |
| 2012/0121486 A1 | 5/2012 | Collier et al. | |
| 2012/0230881 A1 | 9/2012 | Boger et al. | |
| 2013/0121902 A1 * | 5/2013 | Adelmann ......... | B01D 53/9418 423/213.5 |
| 2014/0041366 A1 * | 2/2014 | Seyler ..................... | B01J 29/85 60/274 |
| 2014/0227155 A1 | 8/2014 | Phillips et al. | |
| 2015/0017075 A1 | 1/2015 | Jinbo et al. | |
| 2015/0360212 A1 * | 12/2015 | Chandler ........... | B01D 53/9418 422/177 |
| 2016/0040576 A1 * | 2/2016 | Chandler ................. | B01J 37/04 60/301 |
| 2016/0045868 A1 * | 2/2016 | Sonntag ............... | B01J 35/0006 423/213.2 |
| 2016/0214086 A1 | 7/2016 | Ano et al. | |

FOREIGN PATENT DOCUMENTS

| | | | | |
|---|---|---|---|---|
| GB | 2504024 B | | 1/2014 | |
| GB | 2504024 B | * | 3/2014 | ............. B01D 53/94 |
| WO | 2008094889 A1 | | 8/2008 | |
| WO | 2012059144 A1 | | 5/2012 | |
| WO | 2014/027207 A1 | | 2/2014 | |
| WO | WO 2014/027207 A1 | * | 2/2014 | .......... B01J 37/0246 |

OTHER PUBLICATIONS

Devarakonda, M.N., et al., "Technical Challenges in the Integration of DPF and SCR Aftertreatment—Review From a Systems and Modeling Perspective," 12th DOE Cross-Cut Workshop on Lean Exhaust Emissions Reduction Simulations [CLEERS], Apr. 28-30, 2009, Dearborn, Mich., Abstract, 1 page.
Devarakonda, M.N., et al., "Technical Challenges in the Integration of DPF and SCR Aftertreatment on a Single Substrate—Review From a Systems and Modeling Perspective," presented by Maruthi N. Devarakonda at 12th DOE Cross-Cut Workshop on Lean Exhaust Emissions Reduction Simulations [CLEERS], Apr. 28-30, 2009, Dearborn, Mich., Apr. 29, 2009, 22 pages.
"Engine Aftertreatment Systems: Operator's Manual," No. Y53-1090C, PACCAR Inc, Bellevue, Wash., 2011, 42 pages.
Geisselmann, A., "Future Aftertreatment Concepts for Heavy Duty Application," Abstract in SAE 2014 Heavy Duty Diesel Emissions Control Symposium, Event Guide, Gothenburg, Sweden, Sep. 17-18, 2014, p. 25.
Goffe, R.A., and D.M. Mason, "Electrocatalytic Oxidation of Hydrocarbons on a Stabilized-Zirconia Electrolyte Employing Gold or Platinum Electrodes," Journal of Applied Electrochemistry 11(4):447-452, Jul. 1981.
Kwak, J.H., et al., "Effects of Hydrothermal Aging on $NH_3$-SCR Reaction Over Cu/Zeolites," Journal of Catalysis 287(1):203-209, Mar. 2012.
Kwak, J.H., et al., "Excellent Activity and Selectivity of Cu-SSZ-13 in the Selective Catalytic Reduction of NO(x) and $NH_3$," Journal of Catalysis 275(2):187-190, Oct. 2010.
Rappé, K.G., "Combination and Integration of DPF-SCR Aftertreatment Technologies," presented by Kenneth G. Rappé at Annual Merit Review and Peer Evaluation, May 16, 2012, 24 pages.
Rappé, K.G., and G.D. Maupin, "III.6 Integration of DPF & SCR Technologies for Combined Soot and NO(x) After-Treatment," Advanced Combustion Engine R&D, FY 2014 Annual Report, Pacific Northwest National Laboratory, Richland, Wash., pp. III-30-III-33.
Rappé, K.G., et al., "Combination & Integration of DPF-SCR Aftertreatment," presented by Kenneth G. Rappé at Directions in Engine-Efficiency and Emissions Research Conference [DEER 2011], Detroit, Mich., Oct. 5, 2011, 18 pages.
Rappé, K.G., et al., "Combination & Integration of DPF-SCR Aftertreatment," presented by Kenneth G. Rappé at Directions in Engine-Efficiency and Emissions Research Conference [DEER 2012], Dearborn, Mich., Oct. 18, 2012, 34 pages.
Rappé, K.G., et al., "Combination and Integration of DPF-SCR Aftertreatment Technologies," presented by Darrell R. Herling at the DOE Annual Merit Review and Peer Evaluation, Arlington, Va., May 11, 2011, 24 pages.
Rappé, K.G., et al., "Combination and Integration of DPF-SCR Aftertreatment Technologies," presented by Darrell R. Herling at the DOE Annual Merit Review and Peer Evaluation, Washington, D.C., Jun. 9, 2010, 16 pages.
Rappé, K.G., et al., "II.B.12 Combination and Integration of DPF-SCR After-Treatment," Advanced Combustion Engine R&D, FY 2011 Annual Report, Pacific Northwest National Laboratory, Richland, Wash., pp. 227-230.
Storey, J.M.E., et al., "Characterization of Urea Decomposition Products in Selective Catalytic Reduction Catalyst Systems," Abstracts of Papers of the American Chemical Society, Washington, D.C., 2011, vol. 242, 2 pages.
Ye, Q., et al., "Activity, Propene Poisoning Resistance and Hydrothermal Stability of Copper Exchanged Chabazite-Like Zeolite Catalysts for SCR of NO With Ammonia in Comparison to Cu/ZSM-5," Applied Catalysis A: General 427-428:24-34, Jun. 2012.
Non-Final Office Action mailed Jan. 19, 2017, from U.S. Appl. No. 14/935,199, filed Nov. 6, 2015, 8 pages.
Non-Final Office Action mailed Jan. 23, 2017, from U.S. Appl. No. 14/935,048, filed Nov. 6, 2015, 17 pages.
International Search Report and Written Opinion mailed Mar. 30, 2017, received for International Application No. PCT/US2016/060583, filed Nov. 4, 2016, 7 pages.

* cited by examiner

HIGH EFFICIENCY AND DURABILITY SELECTIVE CATALYTIC REDUCTION CATALYST

BACKGROUND

Internal combustion engine exhaust emissions, and especially diesel engine exhaust emissions, have recently come under scrutiny with the advent of stricter regulations, both in the U.S. and abroad. While diesel engines are known to be more economical to run than spark-ignited engines, diesel engines inherently suffer disadvantages in the area of emissions. For example, in a diesel engine, fuel is injected during the compression stroke, as opposed to during the intake stroke in a spark-ignited engine. As a result, a diesel engine has less time to thoroughly mix the air and fuel before ignition occurs. The consequence is that diesel engine exhaust contains incompletely burned fuel known as particulate matter, or "soot". In addition to particulate matter, internal combustion engines including diesel engines produce a number of combustion products including hydrocarbons ("HC"), carbon monoxide ("CO"), nitrogen oxides ("NOx"), and sulfur oxides ("SOx"). Aftertreatment systems may be utilized to reduce or eliminate emissions of these and other combustion products.

FIG. 1A shows a block diagram providing a brief overview of a vehicle powertrain. The components include an internal combustion engine 20 in flow communication with one or more selected components of an exhaust aftertreatment system 24. The exhaust aftertreatment system 24 optionally includes a catalyst system 96 upstream of a particulate filter 100. In the embodiment shown, the catalyst system 96 is a diesel oxidation catalyst (DOC) 96 coupled in flow communication to receive and treat exhaust from the engine 20. The DOC 96 is preferably a flow-through device that includes either a honeycomb-like or plate-like substrate. The substrate has a surface area that includes (e.g., is coated with) a catalyst. The catalyst can be an oxidation catalyst, which can include a precious metal catalyst, such as platinum or palladium, for rapid conversion of hydrocarbons, carbon monoxide, and nitric oxides in the engine exhaust gas into carbon dioxide, nitrogen, water, or $NO_2$.

Once the exhaust has flowed through DOC 96, the DPF 100 is utilized to capture unwanted diesel particulate matter from the flow of exhaust gas exiting engine 20, by flowing exhaust across the walls of DPF channels. The diesel particulate matter includes sub-micron sized solid and liquid particles found in diesel exhaust. The DPF 100 can be manufactured from a variety of materials including but not limited to cordierite, silicon carbide, and/or other high temperature oxide ceramics.

The treated exhaust gases can then proceed through diesel exhaust fluid doser 102 for the introduction of a reductant, such as ammonia or a urea solution. The exhaust gases then flow to a selective catalytic reduction (SCR) system 104, which can include a catalytic core having a selective catalytic reduction catalyst (SCR catalyst) loaded thereon.

System 24 can include one or more sensors (not illustrated) associated with components of the system 24, such as one or more temperature sensors, NOx sensor, oxygen sensor, mass flow sensor, and a pressure sensor.

As discussed above, the exhaust aftertreatment system 24 includes a Selective Catalytic Reduction (SCR) system 104. The SCR system 104 includes a selective catalytic reduction catalyst which interacts with NOx gases to convert the NOx gases into $N_2$ and water, in the presence of an ammonia reductant. The overall reactions of NOx reductions in an SCR are shown below.

$$4NO+4NH_3+O_2 \rightarrow 4N_2+6H_2O \quad (1)$$

$$6NO_2+8NH_3 \rightarrow 7N_2+12H_2O \quad (2)$$

$$2NH_3+NO+NO_2 \rightarrow 2N_2+3H_2O \quad (3)$$

Where Equation (1) represents a standard SCR reaction and Equation (3) represents a fast SCR reaction.

The performance of the SCR catalyst is often counterbalanced by catalyst durability. This challenge is further compounded by the increasingly stringent emissions regulatory demands on the one hand, and the economic pressure surrounding fuel economy on the other. Furthermore, the performance of the SCR catalyst is influenced by the level of engine out NOx (EO NOx) that has to be processed by the SCR catalyst. The current trend is in the direction of higher engine out NOx to improve fuel economy, while emission levels are simultaneously being reduced. For example, at present, EO NOx can reach as high as 7 g/kW-hr for at least a short period of time. However, it is anticipated that in the future, there will be a move towards very low tailpipe NOx (e.g., decreasing from about 0.2 to about 0.02 g/kW-hr).

High EO NOx has been shown to result in urea deposit build up in the SCR, due to the extremely high levels of diesel exhaust fluid that is introduced into the system, and insufficient residence time for complete decomposition to form $NH_3$. The formation and accumulation of urea deposits on the SCR catalyst can result in severe damage to both the chemical and physical integrity of the SCR coating. Furthermore, the high intensity of diesel exhaust fluid dosing and the relatively long duration of the dosing in urea decomposition reactor 102 can result in large quantities of water being released onto the SCR catalyst. As the SCR catalyst can be supported by zeolites, which are powerful water adsorbing materials, the quantities of water can present a problem with both durability and cold start performance of the SCR catalyst.

At low EO NOx conditions, challenges are similar to those present under extended idling and cold start conditions. In other words, when SCR temperatures are too low for diesel exhaust fluid dosing and normal SCR operation (between about 250-450° C.), other strategies are required to meet emissions standards.

These circumstances place SCR catalyst chemistry at the frontline of systems development for aftertreatment technology. As engine out NOx levels increases, diesel exhaust fluid (e.g., $NH_3$) dosing must also increase to provide adequate amounts of $NH_3$ reductant to meet emissions control requirements. However, at low engine out NOx the SCR's performance becomes more dependent upon storage capacity for $NH_3$ and upon low temperature performance, rather than upon diesel exhaust fluid dosing and decomposition.

Thus, there is a need for a high durability SCR catalyst that is able to withstand the harsh environments resulting from high intensity diesel exhaust fluid dosing. The SCR catalyst should have the requisite emissions controls properties and relatively low hydrophilic properties. The SCR catalyst should exhibit an ability to rapidly release any absorbed water under cold start conditions. The SCR catalyst can function at low temperatures, based upon relatively high $NH_3$ storage at low temperatures. The SCR catalyst should have good NOx storage ability to effectively remove NOx from the exhaust stream (temporarily), and then can enable the reduction of stored NOx to $N_2$ at elevated temperatures. The SCR catalyst should be capable of operating in less than optimal $NO_2$/NOx levels (i.e., <0.5), which is required for the fast SCR reaction. SCR catalysts with enhanced standard SCR reaction capability are also needed. The present disclosure seeks to fulfill these needs and provides further related advantages.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the disclosure features a selective catalytic reduction catalyst composition, including a metal oxide catalyst; and a metal zeolite catalyst or a vanadium oxide catalyst, wherein the catalyst composition increases a conversion efficiency of nitrogen oxides to nitrogen and water by at least 2% compared to the metal oxide catalyst alone, the metal zeolite catalyst alone, or the vanadium oxide catalyst alone.

In another aspect, the disclosure features composition is supported by support structure selected from a ceramic monolith, a metallic substrate.

In yet another aspect, the disclosure features a method of reducing NOx in diesel engine exhaust in a selective catalytic reduction system, including exposing a NOx-containing diesel engine exhaust to the catalyst composition, wherein the catalyst composition is disposed on or within a catalyst support structure.

DESCRIPTION OF THE DRAWINGS

The foregoing aspects and many of the attendant advantages of this invention will become more readily appreciated as the same become better understood by reference to the following detailed description, when taken in conjunction with the accompanying drawings.

DETAILED DESCRIPTION

This disclosure features an exhaust aftertreatment system that includes a selective catalytic reduction catalyst composition that includes a metal oxide catalyst and a metal zeolite catalyst, a metal oxide catalyst that is other than a vanadium oxide catalyst and a vanadium oxide catalyst, or a metal oxide catalyst that is other than a vanadium oxide catalyst together with a metal zeolite catalyst and a vanadium oxide catalyst. When used in a selective catalytic reduction system related to a diesel engine, the catalyst composition can increase a conversion efficiency of nitrogen oxides (NOx) to nitrogen and water by a minimum of 2 percent and/or up to 30 percent, compared to only the metal zeolite catalyst (if present in the catalyst composition), compared to only the metal oxide catalyst (if present in the catalyst composition), or compared to only the vanadium oxide (if present in the catalyst composition).

Figure 1A:
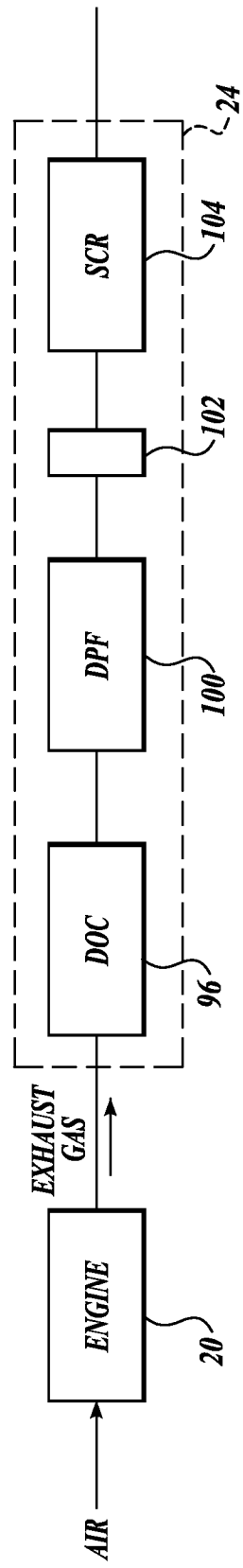
FIG. 1A is a block diagram of an example of an aftertreatment system coupled to an internal combustion engine.
Figure 1B:
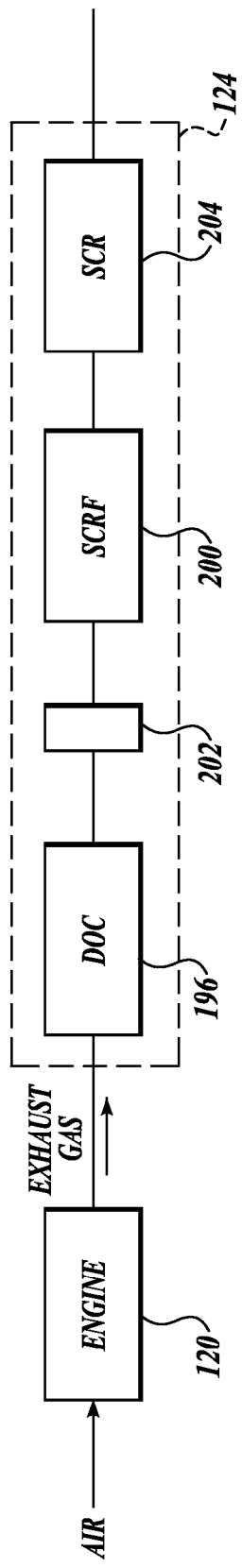
FIG. 1B is a block diagram of an example of an aftertreatment system coupled to an internal combustion engine.
Figure 1C:
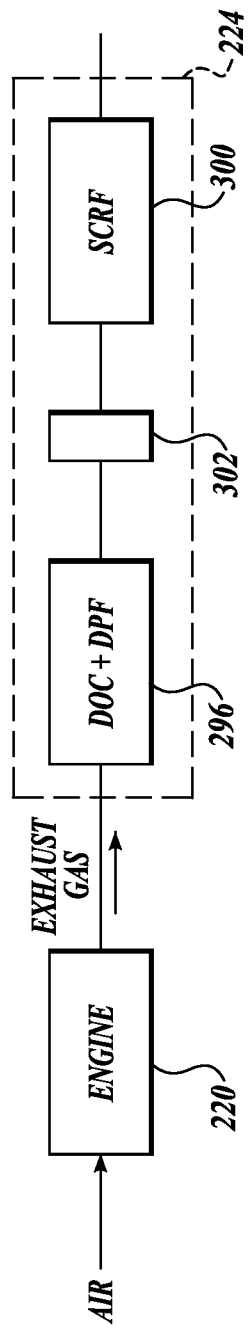
FIG. 1C is a block diagram of an example of an aftertreatment system coupled to an internal combustion engine.

Referring to FIG. 1A, the selective catalytic reduction catalyst composition can be used in a diesel particulate filter in a SCR system 104, such as a wall-flow filter, and particularly the monolithic core of the wall-flow filter. In some embodiments, the selective catalytic reduction catalyst composition can lead to more compact exhaust aftertreatment systems. For example, referring to FIG. 1B, an exhaust aftertreatment system 124 includes a diesel oxidation catalytic system 196 upstream of a diesel exhaust fluid doser 202. A selective catalytic reduction on-filter (SCRF) 200 is downstream of the diesel exhaust fluid doser 202, and SCRF 200 is followed by a selective catalytic reduction system 204. The SCRF includes a diesel particulate filter (DPF) with a catalytic core having a selective catalytic reduction catalyst composition loaded thereon, thereby providing a compact SCRF that combines the functions of both a DPF and a selective catalytic reduction system. In some embodiments, referring to FIG. 1C, an exhaust aftertreatment system 224 includes a combined diesel oxidation catalytic system ("DOC") and a diesel particulate filter 296 upstream of a diesel exhaust fluid doser 302. Downstream of the diesel exhaust fluid doser 302 is SCRF 300, which includes a DPF with a catalytic core having a selective catalytic reduction catalyst composition loaded thereon. Exhaust aftertreatment system 224 has a DPF both upstream and downstream of the mixer and therefore increases the filter capacity. As shown in FIG. 1C, exhaust aftertreatment system 224 is more compact than the exhaust aftertreatment system 124 shown in FIG. 1B.

The catalyst composition can assist in making $NO_2$ in situ without significantly oxidizing $NH_3$ (i.e., by selective catalytic oxidation), while also catalyzing the reduction of NOx (i.e., by selective catalytic reduction), such that the catalyst composition simultaneously exhibits selective catalytic oxidation and selective catalytic reduction properties. The selective catalytic reduction catalyst composition can be provided in the internal surface areas of the wall-flow filter in a manner such that the distribution or loading of the catalyst composition is generally symmetrical across the wall. The catalyst composition can increase the thermal resistance of its individual components (i.e., a metal oxide catalyst, a metal oxide catalyst that is other than a vanadium oxide catalyst, a vanadium oxide catalyst, and/or a metal zeolite catalyst), such that the components can synergistically interact to provide a more robust catalyst composition.

As used herein, a selective catalytic oxidation (SCO) catalyst is a catalyst that facilitates formation of $NO_2$ species in situ by the reaction of $NO+\frac{1}{2}O_2 \rightarrow NO_2$, to serve as reactive intermediates from nitrogen oxides in the exhaust stream, without significantly oxidizing $NH_3$ into $N_2O$.

As used herein, a selective catalytic reduction (SCR) catalyst is a catalyst that catalyzes the reduction of NOx to nitrogen and water.

The catalyst composition of the present disclosure can be optimized by controlling the amount of doping, by controlling the degree of surface modification of precursors, and/or by blending with materials having different properties.

Metal Oxide Catalyst

In some embodiments, the metal oxide catalyst is cerium oxide (e.g., $CeO_2$), titanium oxide (e.g., $TiO_2$), zirconium oxide (e.g., $ZrO_2$), aluminum oxide ($Al_2O_3$), silicon oxide ($SiO_2$), hafnium oxide (e.g., $HfO_2$), vanadium oxide (e.g., $V_2O_5$, $V_2O_3$, $VO_2$), niobium oxide (e.g., $Nb_2O_5$, NbO), tantalum oxide (e.g., $Ta_2O_5$, $Ta_2O$), chromium oxide (e.g., $Cr_2O_3$), molybdenum oxide (e.g., $MoO_2$), tungsten oxide (e.g., $WO_3$), ruthenium oxide (e.g., $RuO_2$), rhodium oxide (e.g., $Rh_2O_3$), iridium oxide (e.g., $IrO_2$), nickel oxide (e.g., NiO), barium oxide (e.g., BaO), yttrium oxide (e.g., $Y_2O_3$), scandium oxide (e.g., $Sc_2O_3$), calcium oxide (e.g., CaO), manganese oxide (e.g., MgO), lanthanum oxide (e.g., $La_2O_3$), strontium oxide (e.g., SrO), cobalt oxide (e.g., CoO, $Co_2O_3$, $Co_3O_4$), and any combination thereof. In some embodiments, the metal oxide catalyst is a metal oxide catalyst different than a vanadium oxide. In some embodiments, the metal oxide catalyst is titanium oxide, zirconium oxide, and/or cerium oxide. In certain embodiments, the metal oxide catalyst is zirconium oxide and/or cerium oxide.

The metal oxide catalyst includes a cationic dopant. The cationic dopant can be $Y^{3+}$, $Sc^{3+}$, $Sr^{2+}$, $Ca^{2+}$, $Mg^{2+}$, $Ni^{2+}$, $Ti^{4+}$, $V^{4+}$, $Nb^{4+}$, $Ta^{5+}$, $Cr^{3+}$, $Mo^{3+}$, $W^{6+}$, $W^{3+}$, $Mn^{2+}$, $Fe^{3+}$, $Zn^{2+}$, $Ga^{3+}$, $Al^{3+}$, $In^{3+}$, $Ge^{4+}$, $Si^{4+}$, $Co^{2+}$, $Ni^{2+}$, $Ba^{2+}$, $La^{3+}$, $Ce^{4+}$, and/or $Nb^{5+}$. In some embodiments, the dopant includes a rare-earth metal (e.g., Sc, Y, La, Ce, Pr, Nd, Pm, Sm, Eu, Gd, Th, Dy, Ho, Er, Tm, Yb, and/or Lu), at any positive oxidation state. For example, the cationic dopant can be $Y^{3+}$, $Sc^{3+}$, and/or $Ca^{2+}$. In some embodiments, the cationic dopant is $Y^{3+}$. In certain embodiments, the cationic dopant is $Sc^{3+}$. In some embodiments, the cationic dopant is $Ca^{2+}$.

In some embodiments, the metal oxide catalyst can include 0.001 mol % or more (e.g., 0.01 mol % or more, 0.1 mol % or more, 0.5 mol % or more, 1 mol % or more, 2 mol % or more, 5 mol % or more, 7 mol % or more, 10 mol % or more, 15 mol % or more, 20 mol % or more, 25 mol % or more, 30 mol % or more, 35 mol % or more) and/or 40 mol % or less (e.g., 35 mol % or less, 30 mol % or less, 25 mol % or less, 20 mol % or less, 15 mol % or less, 10 mol % or less, 7 mol % or less, 5 mol % or less, 2 mol % or less, 1 mol % or less, 0.5 mol % or less, 0.1 mol % or less, or 0.01 mol % or less) of the cationic dopant, relative to the total composition of the metal oxide catalyst. For example, the metal oxide catalyst can include between 0.1 mol % and 25 mol % (e.g., between 0.1 mol % and 15 mol %, between 0.1 mol % and 10 mol %, between 5 and 10 mol %, or between 5 and 15 mol %) of the cationic dopant, relative to the total composition of the metal oxide catalyst. In some embodiments, the metal oxide catalyst includes about 3 mol %, about 8 mol %, or about 20 mol % of the cationic dopant, relative to the total composition of the metal oxide catalyst. As used herein, the term "about" indicates that the subject value can be modified by plus or minus 5% and still fall within the described and/or claimed embodiment.

In some embodiments, when the cationic dopant is $Y^{3+}$, $Sc^{3+}$, and/or $Ca^{2+}$, the metal oxide catalyst can include 0.1 mol % or more (e.g., 0.5 mol % or more, 1 mol % or more, 2 mol % or more, 5 mol % or more, 7 mol % or more, 10 mol % or more, 15 mol % or more, 20 mol % or more, 25 mol % or more, 30 mol % or more, 35 mol % or more) and/or 40 mol % or less (e.g., 35 mol % or less, 30 mol % or less, 25 mol % or less, 20 mol % or less, 15 mol % or less, 10 mol % or less, 7 mol % or less, 5 mol % or less, 2 mol % or less, 1 mol % or less, or 0.5 mol % or less) of the cationic dopant, relative to the total composition of the metal oxide catalyst. For example, the metal oxide catalyst can include between 0.1 mol % and 25 mol % (e.g., between 0.1 mol % and 15 mol %, between 0.1 mol % and 10 mol %, between 5 and 10 mol %, or between 5 and 15 mol %) of $Y^{3+}$, $Sc^{3+}$, and/or $Ca^{2+}$. In some embodiments, the metal oxide catalyst includes about 3 mol %, about 8 mol %, or about 20 mol % of $Y^{3+}$, $Sc^{3+}$, and/or $Ca^{2+}$.

In some embodiments, the metal oxide catalyst is yttria-doped zirconia (i.e., yttria-stabilized zirconia). In some embodiments, the metal oxide catalyst is yttria-doped ceria (i.e., yttria-stabilized ceria). In some embodiments, the metal oxide catalyst is yttria-doped mixed zirconia and ceria. The yttrium can be present in an amount of about 3 mol %, about 8 mol %, or about 20 mol % relative to the total composition of the metal oxide. In some embodiments, the yttrium is present in an amount of about 8 mol %, relative to the total composition of the metal oxide. In some embodiments, the metal oxide catalyst is scandia-doped zirconia and/or ceria (i.e., scandia-stabilized zirconia and/or ceria). The scandium can be present in an amount of about 3 mol %, about 10 mol %, or about 20 mol %, relative to total composition of the metal oxide. In some embodiments, the scandium is present in an amount of about 10 mol %, relative to the total composition of the metal oxide. In some embodiments, the metal oxide catalyst is calcium-doped zirconia and/or ceria (i.e., calcium-stabilized zirconia and/or ceria). The calcium can be present in an amount of about 5 mol %, about 10 mol %, about 16 mol %, or about 20 mol % relative to the total composition of the metal oxide. In some embodiments, the calcium is present in an amount of about 16 mol %, relative to the total composition of the metal oxide.

In some embodiments, the metal oxide is surface-modified with one or more metal elements, such as Nb (e.g., $Nb^{5+}$, $Nb^{4+}$), Ca (e.g., $Ca^{2+}$), Sc (e.g., $Sc^{3+}$), Ta (e.g., $Ta^{5+}$), Ti (e.g., $Ti^{4+}$), V (e.g., $V^{4+}$), Cr (e.g., $Cr^{3+}$), Mn (e.g., $Mn^{2+}$), Mo (e.g., $Mo^{3+}$), Al (e.g., $Al^{3+}$), Si (e.g., $Si^{4+}$), Ge (e.g., $Ge^{4+}$), Ir (e.g., $Ir^{4+}$), Os (e.g., $Os^{4+}$), Fe (e.g., $Fe^{3+}$), Co (e.g., Co$^{2+}$), Ni (e.g., Ni$^{2+}$), Cu (e.g., Cu$^+$), Y (e.g., Y$^{3+}$), Zr (e.g., Zr$^{4+}$), Ru (e.g., Ru$^{4+}$), Rh (e.g., Rh$^{3+}$), Pd (e.g., Pd$^{2+}$), Pt (e.g., Pt$^{2+}$), Ag (e.g., Ag$^+$), Ba (e.g., Ba$^{2+}$), W (e.g., W$^{6+}$, W$^{3+}$), La (e.g., La$^{3+}$), Re, and/or Ce (e.g., Ce$^{4+}$), each of which can be independently positively charged. As used herein, "metal elements" include both uncharged metal elements and metal cations. The one or more metal elements can form an intimate layer with an underlying metal oxide surface. In some embodiments, the one or more metal elements are covalently bonded to the underlying metal oxide surface, where the one or more metal elements can occupy a location in the crystal lattice of the metal oxide in the form of a metal ion surrounded by the requisite number of oxide counter ions to achieve overall electrical neutrality. When the metal oxide is surface-modified, the metal oxide can further catalyze the conversion of NO to NO$_2$ and facilitate the NOx conversion to N$_2$ and H$_2$O, and/or the conversion of hydrocarbons to CO$_2$ and H$_2$O.

The metal element can be present in or on a metal oxide in an amount of 0.001 wt % or more (e.g., 0.01 wt % or more, 0.1 wt % or more, 1 wt % or more, 5 wt % or more, 10 wt % or more, 15 wt % or more, 20 wt % or more, 25 wt % or more, 30 wt % or more, or 35 wt % or more) and/or 40 wt % or less (e.g., 35 wt % or less, 30 wt % or less, 25 wt % or less, 20 wt % or less, 15 wt % or less, 10 wt % or less, 5 wt % or less, 1 wt % or less, 0.1 wt % or less, or 0.01 wt % or less), relative to the total composition of the metal oxide. In some embodiments, the metal element is present in or on a metal oxide in an amount of about 0.001 wt %, relative to the total composition of the metal oxide. In some embodiments, the metal element is present in or on a metal oxide in an amount of about 0.1 wt %, relative to the total composition of the metal oxide. In some embodiments, the metal element is present in or on a metal oxide in an amount of about 5 wt %, relative to the total composition of the metal oxide. In some embodiments, the metal element is present in or on a metal oxide in an amount of about 15 wt %, relative to the total composition of the metal oxide. In some embodiments, the metal element is present in or on a metal oxide in an amount of about 25 wt %, relative to the total composition of the metal oxide. In some embodiments, the metal element is present in or on a metal oxide in an amount of about 40 wt %, relative to the total composition of the metal oxide.

In the catalyst composition, the metal oxide catalyst can serve as storage for NOx, O$_2$, and NH$_3$. The metal oxide catalyst can participate in redox reactions in the selective catalytic reduction system.

Zeolite Catalyst

As discussed above, the catalyst composition can include a metal zeolite catalyst. For example, the metal zeolite catalyst can be Fe-doped aluminosilicate zeolites, Cu-doped aluminosilicate zeolites, Fe and Cu-doped aluminosilicate zeolites, Fe-doped silico-alumino-phosphate zeolites, Cu-doped silico-alumino-phosphate zeolites, and/or Fe and Cu-doped silico-alumino-phosphate zeolites. In some embodiments, the zeolite is ZSM-5 (available from ACS Material), SSZ-13, or SAPO-34 (available from ACS Materials) that is Fe and/or Cu-doped.

The metal zeolite catalyst can include a Cu and/or a Fe dopant in an amount of from 0.01 wt % (e.g., from 0.1 wt %, from 1 wt %, from 2 wt %, from 3 wt %, or from 4 wt %) to 5 wt % (e.g., to 4 wt %, to 3 wt %, to 2 wt % to 1 wt %, or to 0.1 wt %), relative to the total composition of the metal zeolite.

In some embodiments, the metal zeolite is surface-modified with one or more metal elements, such as Nb (e.g., Nb$^{5+}$, Nb$^{4+}$), Ca (e.g., Ca$^{2+}$), Sc (e.g., Sc$^{3+}$), Ta (e.g., Ta$^{5+}$), Ti (e.g., Ti$^{4+}$), V (e.g., V$^{4+}$), Cr (e.g., Cr$^{3+}$), Mn (e.g., Mn$^{2+}$), Mo (e.g., Mo$^{3+}$), Al (e.g., Al$^{3+}$), Si (e.g., Si$^{4+}$), Ge (e.g., Ge$^{4+}$), Ir (e.g., Ir$^{4+}$), Os (e.g., Os$^{4+}$), Fe (e.g., Fe$^{3+}$), Co (e.g., Co$^{2+}$), Ni (e.g., Ni$^{2+}$), Cu (e.g., Cu$^+$), Y (e.g., Y$^{3+}$), Zr (e.g., Zr$^{4+}$), Ru (e.g., Ru$^{4+}$), Rh (e.g., Rh$^{3+}$), Pd (e.g., Pd$^{2+}$), Pt (e.g., Pt$^{2+}$), Ag (e.g., Ag$^+$), Ba (e.g., Ba$^{2+}$), W (e.g., W$^{6+}$, W$^{3+}$), La (e.g., La$^{3+}$), Re, and/or Ce (e.g., Ce$^{4+}$), each of which can be independently positively charged. In some embodiments, it is believed that surface modification of the metal zeolites modulates the water adsorbing ability of metal zeolites and can increase the rate at which water vapor can be removed from the catalyst composition at cold start, so that the catalyst composition can rapidly attain the desired reaction temperatures for effective emissions control. In some embodiments, it is believed that without surface modification, a metal zeolite can have relatively high levels water uptake and can become deactivated as the metal ions (e.g., Cu$^{2+}$ and C$^+$) that are the active sites are leached out of the metal zeolite. Furthermore, without surface modification, it is believed that a metal zeolite can lose adhesive properties and fall off the substrate onto which it is coated upon (e.g., a cordierite monolith or metallic substrate). Thus, surface modification of the metal zeolites with metallic elements (e.g., Nb in the form of niobium pentoxide) can enhance durability, NRE performance, as well as modulate the water uptake and desorption properties of metal zeolites. In some embodiments, the surface-modified metal zeolite can serve as a source for stored water at temperatures several hundred degrees above its boiling point.

While the metal zeolite catalyst can have both reductive and oxidative properties, the metal zeolite catalyst of the present disclosure is selected for its reductive properties and selected against its oxidative properties.

Vanadium Oxide Catalyst

As discussed above, the catalyst composition can include a vanadium oxide catalyst. In some embodiments, the vanadium oxide catalyst is VO; V$_2$O$_3$; VO$_2$; V$_2$O$_5$; phases with the general formula V$_n$O$_{2n+1}$ that exist between V$_2$O$_5$ and VO$_2$ such as V$_3$O$_7$, V$_4$O$_9$ and V$_6$O$_{13}$; phases with the general formula VnO$_{2n-1}$ that exist between VO$_2$ and V$_2$O$_3$ such as V$_4$O$_7$, V$_5$O$_9$, V$_6$O$_{11}$, V$_7$O$_{13}$ and V$_8$O$_{15}$.

In some embodiments, the vanadium oxide is surface-modified with one or more metal elements, such as Nb (e.g., Nb$^{5+}$, Nb$^{4+}$), Ca (e.g., Ca$^{2+}$), Sc (e.g., Sc$^{3+}$), Ta (e.g., Ta$^{5+}$), Ti (e.g., Ti$^{4+}$), V (e.g., V$^{4+}$), Cr (e.g., Cr$^{3+}$), Mn (e.g., Mn$^{2+}$), Mo (e.g., Mo$^{3+}$), Al (e.g., Al$^{3+}$), Si (e.g., Si$^{4+}$), Ge (e.g., Ge$^{4+}$), Ir (e.g., Ir$^{4+}$), Os (e.g., Os$^{4+}$), Fe (e.g., Fe$^{3+}$), Co (e.g., Co$^{2+}$), Ni (e.g., Ni$^{2+}$), Cu (e.g., Cu$^+$), Y (e.g., Y$^{3+}$), Zr (e.g., Zr$^{4+}$), Ru (e.g., Ru$^{4+}$), Rh (e.g., Rh$^{3+}$), Pd (e.g., Pd$^{2+}$), Pt (e.g., Pt$^{2+}$), Ag (e.g., Ag$^+$), Ba (e.g., Ba$^{2+}$), W (e.g., W$^{6+}$, W$^{3+}$), La (e.g., La$^{3+}$), Re, and/or Ce (e.g., Ce$^{4+}$), each of which can be independently positively charged.

While vanadium oxide catalysts have both reductive and oxidative properties, the vanadium oxide catalysts of the present disclosure are selected for their reductive properties.

Catalyst Composition

In some embodiments, the catalyst composition includes from 2 wt % (e.g., from 5 wt %, from 10 wt %, from 15 wt %, from 20 wt %, from 30 wt %, from 40 wt %) to 50 wt % (e.g., to 40 wt %, to 30 wt %, to 20 wt %, to 15 wt %, to 10 wt %, to 5 wt %) of the metal oxide catalyst, so long as the sum of the amount of metal oxide catalyst, metal zeolite catalyst, and/or vanadium oxide catalyst is 100%.

In some embodiments, the catalyst composition includes from 50 wt % (e.g., from 60 wt %, from 70 wt %, from 80 wt %, from 85 wt %, from 90 wt %, or from 95 wt %) to 98 wt % (e.g., to 95 wt %, to 90 wt %, to 85 wt %, to 80 wt %, to 70 wt %, or to 60 wt %) of a metal zeolite catalyst, so long as the sum of the amount of metal oxide catalyst, metal zeolite catalyst, and/or vanadium oxide catalyst is 100%.

In some embodiments, the catalyst composition includes from 50 wt % (e.g., from 60 wt %, from 70 wt %, from 80 wt %, from 85 wt %, from 90 wt %, or from 95 wt %) to 98 wt % (e.g., to 95 wt %, to 90 wt %, to 85 wt %, to 80 wt %, to 70 wt %, or to 60 wt %) by weight of a vanadium oxide catalyst, so long as the sum of the amount of metal oxide catalyst, metal zeolite catalyst, and/or vanadium oxide catalyst is 100%.

In certain embodiments, the catalyst composition includes from 20 wt % (e.g., from 30 wt %, or from 40 wt %) to 50 wt % (e.g., to 40 wt %, or to 30 wt %) of the metal oxide catalyst; the catalyst composition includes from 50 wt % (e.g., from 60 wt %, or from 70 wt %) to 80 wt % (e.g., to 70 wt %, or to 60 wt %) of a metal zeolite catalyst; the catalyst composition includes from 50 wt % (e.g., from 60 wt %, or from 70 wt %) to 80 wt % (e.g., to 70 wt %, or to 60 wt %) by weight of a vanadium oxide catalyst, so long as the sum of the amount of metal oxide catalyst, metal zeolite catalyst, and/or vanadium oxide catalyst is 100%.

In some embodiments, the metal oxide in the catalyst composition has high thermal stability combined with electrical conductivity, ionic conductivity, or magnetic properties (e.g., paramagnetism, ferromagnetism, etc.). In some embodiments, the metal oxide is present in the form of a vanadate, niobiate, molybdate, borate, manganate, etc.

In some embodiments, the catalyst composition includes a metal oxide having a mixture of cationic dopants, such as $(BaTiO_3)(SrTiO_3)$.

In some embodiments, the metal oxide in the catalyst composition is one or more of yttria-stabilized zirconia, yttria-stabilized ceria, or yttria-stabilized ceria-zirconia mixed oxide; barium zirconate (e.g., $BaZrO_3$), and/or yttria-doped barium zirconium oxide (a spinel oxide with high proton conducting properties, such as $BaZr_{0.8}Y_{0.2}O_3$).

Examples of vanadates include ziesite (a copper vanadate mineral with formula $\beta$-$Cu_2V_2O_7$); bismuth copper vanadate (e.g., $BiCu_2VO_6$); lithium nickel vanadate (e.g., $Li_xNiVO_4$, where x=0.8, 1.0, or 1.2, such as $Li_{0.8}NiVO_4$ or $Li_{1.2}NiVO_4$); iron vanadate (e.g., $Fe_4(VO_4)_4.5H_2O$); ferric vanadate (e.g., $FeVO_4$); nickel vanadate (e.g., $Ni(VO_3)_2$); nickel vanadium oxide (e.g., $NiV_2O_6$); zirconium vanadate (e.g., $ZrV_2O_7$, $Zr(OH)_2(HOV_4)_2.2H_2O$); cerium vanadate (e.g., ortho-$Ce_2O_3.V_2O_5$, pyro-$2Ce_2O_3.3V_2O_5$, meta-$Ce_2O_3.3V_2O_5$, $CeVO_4$, or $CeV_2O_{10}$); barium vanadate ($Ba_3(VO_4)_2$); and/or manganese vanadate ($MnV_2O_6$).

In some embodiments, the metal oxide is barium strontium titanate ($Ba_{0.6}Sr_{0.4}TiO_3$, a semiconducting perovskite oxide); and/or lanthanum strontium cobalt oxide (e.g., $La_{0.6}Sr_{0.4}CoO_3$, a semiconducting perovskite oxide).

Examples of zeolites in the catalyst composition can include ZSM-5 and high temperature stable zeolites such as SAPO-34 and SSZ-13 (chabazite). In some embodiments, alternatively or in addition to zeolites, the catalyst composition can include vanadia-based SCR catalysts.

Without wishing to be bound by theory, it is believed that in the catalyst composition, the metal oxide catalyst can provide thermal stability to the metal zeolite catalyst, such that the increase in thermal stability is more than the additive thermal stabilities of the components of the catalyst composition.

When viewed microscopically, the catalyst composition can appears as a mixture of metal oxide catalyst particles and metal zeolite particles. If a metal element is present, the metal element can form an intimately mixed layer with the surface of the metal oxide catalyst, can be present within the pores of the zeolites, and/or form an intimate mixed layer on the surface of the zeolites. The metal element can form a continuous or discontinuous coating on the surface of the metal oxide catalyst or the zeolites.

In some embodiments, the metal element is in the form of a layer having a thickness of from 0.001 nm (e.g., from 0.01 nm, from 0.1 nm, or from 0.5 nm) to 1 nm (e.g., to 0.5 nm, to 0.1 nm, to 0.01 nm). The layer can have a variety of morphologies, such as complex mosaic of functionalities or a uniformly transformed surface layer.

Without wishing to be bound by theory, it is believed that as the organometallic reagent penetrates the metal oxide or metal zeolite surface layers and chemically reacts with the metal oxide or metal zeolite, a range of different stoichiometry of the resulting amalgam can occur as a function of depth of penetration and as a function of access to the particle surface. It is believed that these stoichiometric differences can result in the existence of catalytically active species in two or more valency states, thereby enhancing the catalytic redox properties of the resulting catalyst. The surface modification methods described herein can anchor active metal element moieties into the upper layers and enable catalytic sites to grow from the anchor sites. The catalytic sites can be more stable and less likely to migrate (i.e., sinter or cluster), and less likely to lose activity over time under high temperature conditions, thereby affording more robust and more durable catalysts. In some embodiments, the surface-modified catalysts can enhance specific surface area for desirable reactions to occur on the surface of the catalyst.

In some embodiments, the catalyst composition is made by mixing the catalyst components in a slurry. The slurry can contain, for example, 81% CuZSM-5 and 19% nano-particle sized $ZrO_z$ (in the form of Nyacol). This mixed slurry was applied as a washcoat onto a suitable substrate and then calcined to obtain a durable catalyst with high catalytic activity.

Methods of Use

The SCR catalyst composition can be coated onto a ceramic monolith or a metal substrate that is used in diesel SCR applications. For example, the SCR catalyst composition can be applied to porous walled ceramic monolith structures (i.e., flow-through ceramic monolith structures) in SCR on-filter (SCRF) systems. When a NOx-containing diesel engine exhaust is exposed to the SCR catalyst composition, the NOx is reduced to nitrogen and water, in the presence of a reductant such as ammonia or urea.

In some embodiments, the SCR catalyst composition has a 50% CO to $CO_2$ conversion temperature of 500° C. or more. The SCR catalyst composition can have a 50% NO to $NO_2$ conversion temperature of 500° C. or more. The SCR catalyst composition can have a 50% $C_2H_4$ to $CO_2$ and $H_2O$ conversion temperature of 500° C. or more.

The SCR catalyst composition of the present disclosure can present numerous advantages. For example, in some embodiments, the SCR catalyst composition of the present disclosure enhances $NH_3$ storage compared to the metal zeolite or the metal oxide, to enable effective low temperature SCR function, for example, at below about 250° C. when exhaust temperatures may be too low for diesel exhaust fluid dosing. The SCR catalyst composition can achieve effective high temperature SCR performance in the range of about 450° C.

The SCR catalyst composition can exhibit high durability under high intensity prolonged diesel exhaust fluid dosing in response to high EO NOx, and can exhibit high hydrothermal stability. In some embodiments, durability of the SCR catalyst composition can be assessed using the durability test, where nitrogen gas at 70 psi is applied as a prolonged burst onto a SCR catalyst composition-coated article, and the weight before and after the nitrogen exposure are compared. A weight loss of ≤3% is considered to be highly durable. The durability test is further described and exemplified in U.S. Ser. No. 14/934,955, entitled "Surface-Modified Catalyst Precursors for Diesel Engine Aftertreatment Applications," filed concurrently with the present application and herein incorporated by reference in its entirety. In some embodiments, hydrothermal stability is increased in the overall composition. Hydrothermal stability can be measured by comparing "fresh" and "aged" samples for catalytic activity; where aging refers to a form of accelerated aging, for example, by exposing a sample to water and high temperatures. Measurement of hydrothermal stability is further described and exemplified in U.S. Ser. No. 14/934,955, entitled "Surface-Modified Catalyst Precursors for Diesel Engine Aftertreatment Applications," filed concurrently with the present application and herein incorporated by reference in its entirety.

The SCR catalyst composition can decompose urea deposits, thereby decreasing the likelihood of urea deposit accumulation. An SCR catalyst composition that has one or more metal element surface-modified components can exhibit reduced water uptake compared to a catalyst without surface modification during extended idle periods and can exhibit rapid water desorption from the catalyst composition in engine cold starts. Examples of catalysts having reduced water uptake and rapid water desorption are described, for example, in U.S. Ser. No. 14/934,955, entitled "Surface-Modified Catalyst Precursors for Diesel Engine Aftertreatment Applications," filed concurrently with the present application and herein incorporated by reference in its entirety.

In some embodiments, the SCR catalyst composition can have good NOx storage capability under low EO NOx conditions. The SCR catalyst composition can operate under low $NO_2$ conditions. Without wishing to be bound by theory, it is believed that in the range of [$NO_2$]/[NOx] concentration ratio values from 0 to 0.35 a steady and dramatic decline can be observed in NOx conversion efficiency, because of the impairment of fast SCR reaction. However, it is believed that the effect of $NO_2$ is an intermediate surface effect, thus, the in situ generation of this species renders a catalyst composition effectively independent of bulk concentration of $NO_2$ in the exhaust stream. Hence, the catalyst composition can be effective even in the presence of soot for SCRF application.

Furthermore, even in the range of $NO_2$/NOx values of from 0.35 to 0.5, the catalyst compositions of the present disclosure can enhance, stabilize, and/or quicken response times (e.g., under transient conditions), such as during engine cold starts. For example, the response times of the catalyst compositions of the present disclosure during engine cold starts can be in the tens of seconds, rather than hundreds of seconds. In some embodiments, the SCR catalyst composition allows a relatively low catalyst loading, such as from 30 g/L (e.g., from 40 g/L, from 50 g/L, from 60 g/L, or from 70 g/L) to 80 g/L (e.g., to 70 g/L, to 60 g/L, to 50 g/L, to 40 g/L), compared with 120-170 g/L for conventional SCR catalysts, to achieve a desired SCR performance level, thereby enabling lower system back pressure and improved fuel economy.

In some embodiments, the catalyst composition increases a conversion efficiency of nitrogen oxides to nitrogen and water by at least 2% (e.g., at least 5%, at least 10%, at least 15%, at least 20%, or at least 25%) and/or up to 30% (e.g., up to 25%, up to 20%, up to 15%, up to 10%, or up to 5%) compared to the intrinsic catalytic activity of the metal zeolite alone, the metal oxide alone, or vanadium oxide alone.

In some embodiments, the SCR catalyst composition can show high tolerance to hydrocarbon accumulation during extended idle due to selective catalytic oxidation for both hydrocarbon and carbon monoxide, thus minimizing the effects of these chemical poisons and uncontrolled hydrocarbon light-off.

In some embodiments, the SCR catalyst composition has an increased chemical resistance to sulfur poisoning such that adsorbed sulfur can be removed at low temperature. The SCR catalyst composition can in some embodiments also have increased thermal stability such that the catalyst composition can withstand repeated heat regeneration to remove sulfur and other forms of excessive heat exposure.

The combination of the metal oxide catalyst with a metal zeolite catalyst and/or a vanadium oxide catalyst combines the properties of the different catalysts in a synergistic manner, such that the catalyst composition has superior characteristics than the addition of the properties of the individual components, as shown in Table 1.

TABLE 1

Properties of SCR catalyst composition.

| Characteristic | Metal zeolite | Metal oxide | SCR catalyst composition |
| --- | --- | --- | --- |
| Redox properties | Medium | High | High |
| Activated by metal ions | High | High | High |
| Low temperature NOx reduction efficiency | Low | Medium | High |
| High temperature NOx reduction efficiency | Medium | Medium | High |
| $NH_3$ storage | High | High | High |
| NOx storage | Medium | Medium | Medium |
| Oxygen storage | Low | High | High |
| Hydrothermal Stability | Medium | High | High |
| Hydrocarbon and carbon monoxide oxidation | Low | Medium | Medium |
| Sulfur resistance | Not applicable | Medium | Medium |
| $NH_3$ stability to oxidation | Not applicable | Low | Medium |
| Low $N_2O$ Emissions | Low | Medium | Medium |
| In situ NOx— make | Not applicable | Medium | Medium |
| Resistance to $H_2O$ uptake | Not applicable | Medium | Medium |
| Urea deposit degradation | Not applicable | Medium | Medium |

The following examples are included for the purpose of illustrating, not limiting, the described embodiments.

Example 1 describes a protocol for evaluating NO$_2$-make catalyst. Example 2 describes the synthesis of base metal modified metal oxide catalysts. Example 3 tests the performance of SCR catalysts when coated on a DPF. Example 4 describes the NO$_2$/NOx gas stream testing of high performance SCR catalyst on DPF. Example 5 describes protocols for metal zeolite catalyst preparation.

EXAMPLES

Abbreviations:
YSZ: yttria-stabilized zirconia
YSC: yttria-stabilized ceria
PEG: poly(ethylene glycol)
PPG: poly(propylene glycol)
PEO: polyethylene oxide
DI water: deionized water
DOC: diesel oxidation catalyst
GHSV: gas hourly spatial velocity
NRE: NOx reduction efficiency Example 1. NO$_2$-Make Catalyst Screening and Selection The following washcoat composition was dip coated onto a cordierite (5/300) substrate (available from NGK Automotive Ceramics, U.S.A., Inc.), in the form of 1"×1" core samples at 30° C., with a vacuum applied to pull excess washcoat through the channel and assist in drying: 25.6% YSZ-8; 8.3% YSC-10; 19.9% Nyacol®; 3.4% poly(ethylene glycol-ran-propylene glycol), M$_n$ ~2,500 (Sigma Aldrich); 0.3% PEO; and 42.2% DI water. The washcoat was dried at 105° C. in air and calcined at 450° C. for 1 hr.

DOC Light-Off Testing of Catalyst Washcoat on Cordierite Core Samples

A synthetic gas test bench for testing catalyst core samples was employed to evaluate various catalyst washcoats for their ability to activate undesirable oxidative side reactions. This also provided insight into their potential ability to oxidize the NH$_3$ produced from DEF dosing.

Selected core samples were evaluated in a DOC light-off experiment. A fresh core sample from a commercial DOC catalyst was used as a reference.

The gas mixture used at 60,000 GHSV to simulate a diesel exhaust is as follows: 600 ppm NO; 75 ppm C$_2$H$_4$; 300 ppm CO; 10% O$_2$; 5.6% CO$_2$; 6% H$_2$O; balance N$_2$; at 60,000 GHSV.

A reverse light-off test procedure was employed, where the temperature was increased from 160° C. to the setpoint of 600° C., and was allowed to stabilize. Heating was then discontinued and both the inlet temperature and the reactor outlet gas concentration were monitored.

From the results, conversion efficiencies were computed and plotted to obtain the temperature at which 50% of the total conversion efficiency was achieved for CO conversion to CO$_2$ (T$_{50}$ CO); NO conversion to NO$_2$ (T$_{50}$ NO); and C$_2$H$_4$ conversion to CO$_2$ and H$_2$O (T$_{50}$ C$_2$H$_4$).

The results were shown in Table 2, where all of the tested catalysts could potentially be employed for NO$_2$ make catalyst, because they exhibited no capability to activate oxidative light-off reactions below 500° C. in the absence of PGM catalytic species.

TABLE 2

DOC Light-off Properties of Redox Catalysts on Cordierite (1" × 1") Core Samples.

| CATALYST | Washcoat Loading (g/L) | T$_{50}$CO (° C.) | T$_{50}$NO (° C.) | T$_{50}$C$_2$H$_4$ (° C.) |
|---|---|---|---|---|
| Commercial DOC Catalyst | | 138 | 242 | 247 |
| YSZ-8 | 156 | >600 | N/A | 581 |
| YSZ-8/YSC-10 | 103 | 586 | N/A | 590 |
| YSZ-8/CeO$_2$—ZrO$_2$ | 224 | 550 | N/A | 573 |
| YSC-10 | 43 | 583 | N/A | 592 |

Figure 2:
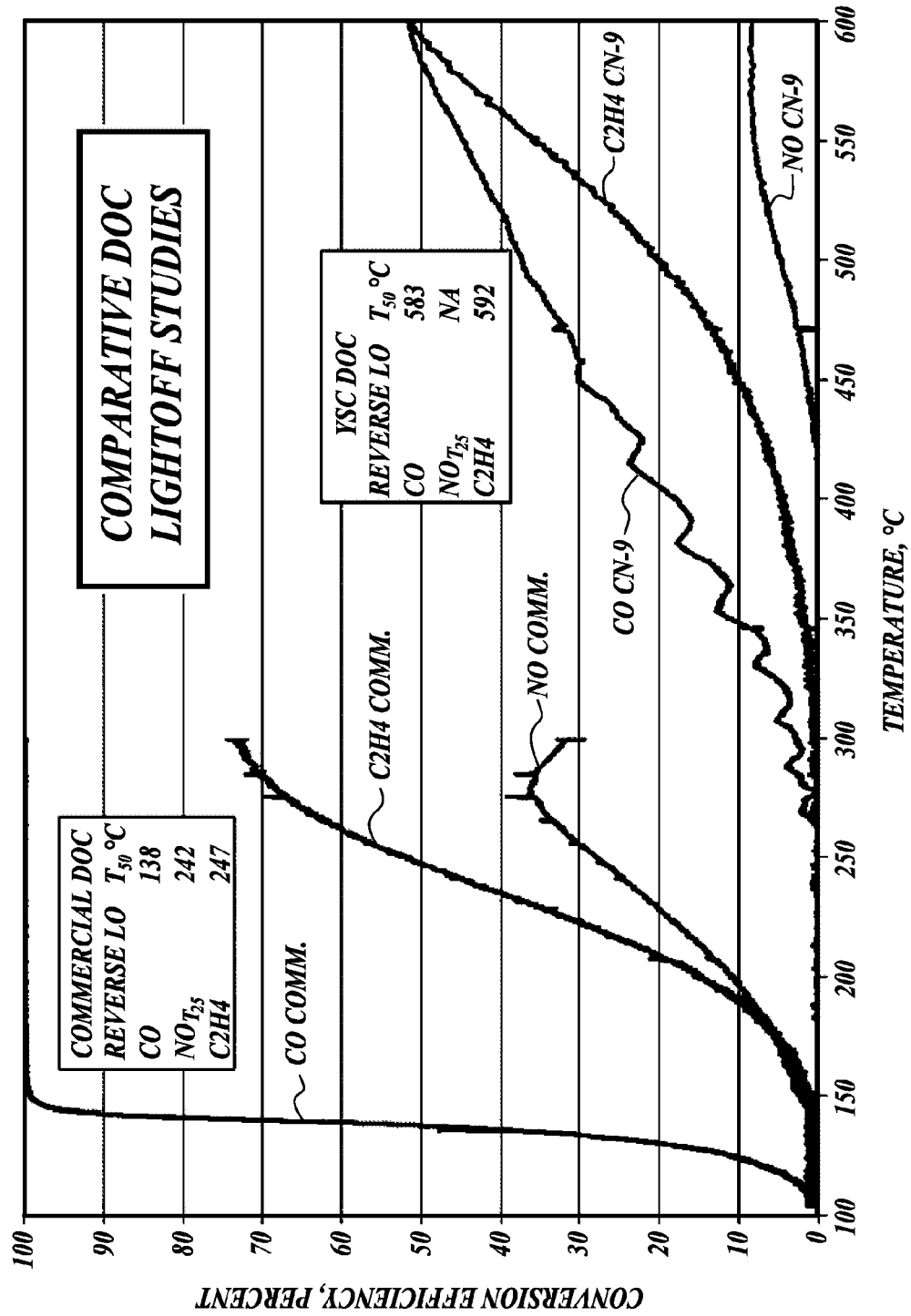
FIG. 2 is a graph showing the relative performance of a commercial DOC containing a platinum group metal (PGM) and an embodiment of a $NO_2$-make catalyst of the present disclosure.
Figure 3:
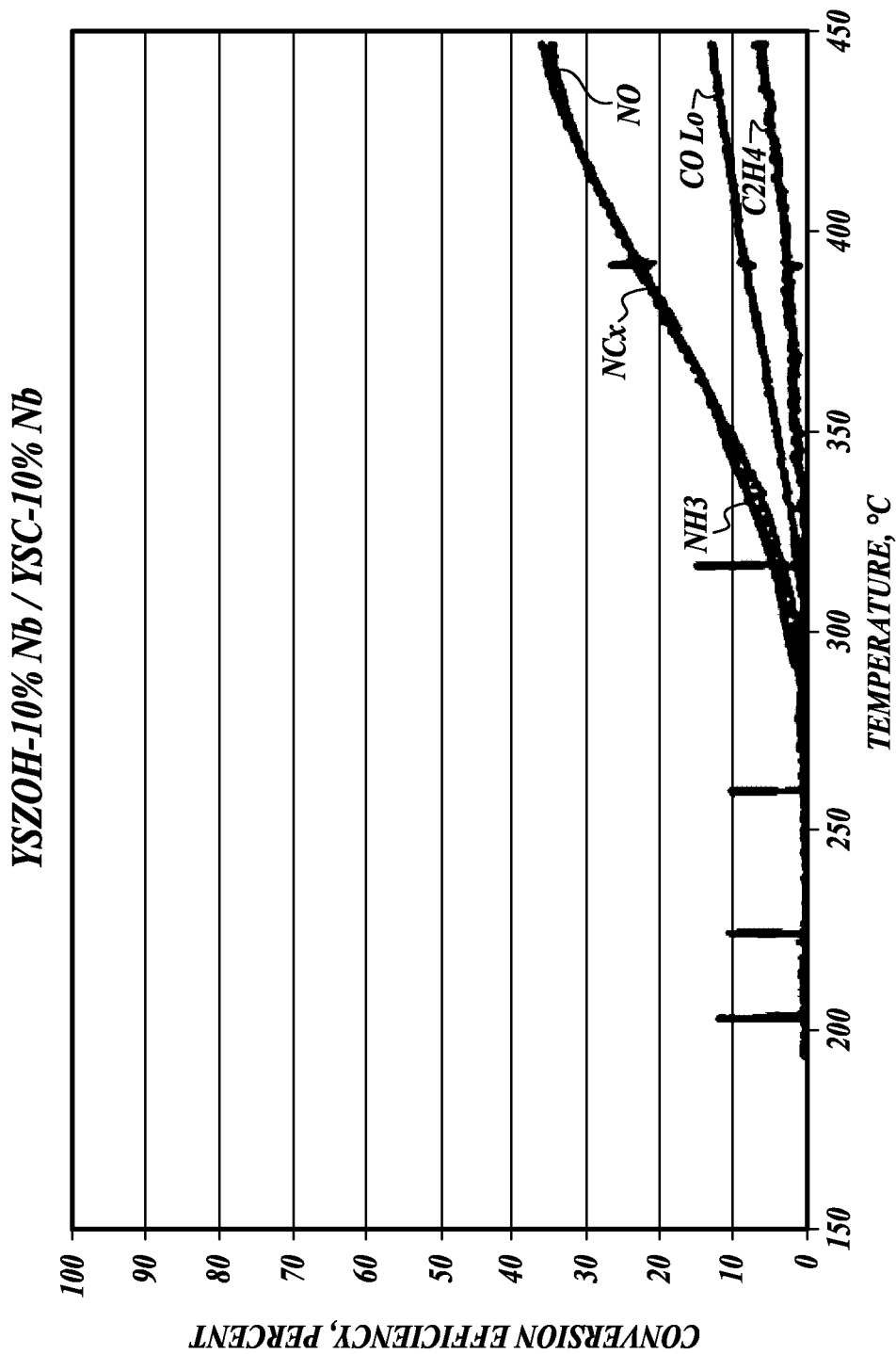
FIG. 3 is graph showing the NOx conversion efficiency of a Nb-surface-modified YSZ/YSC.
Figure 4:
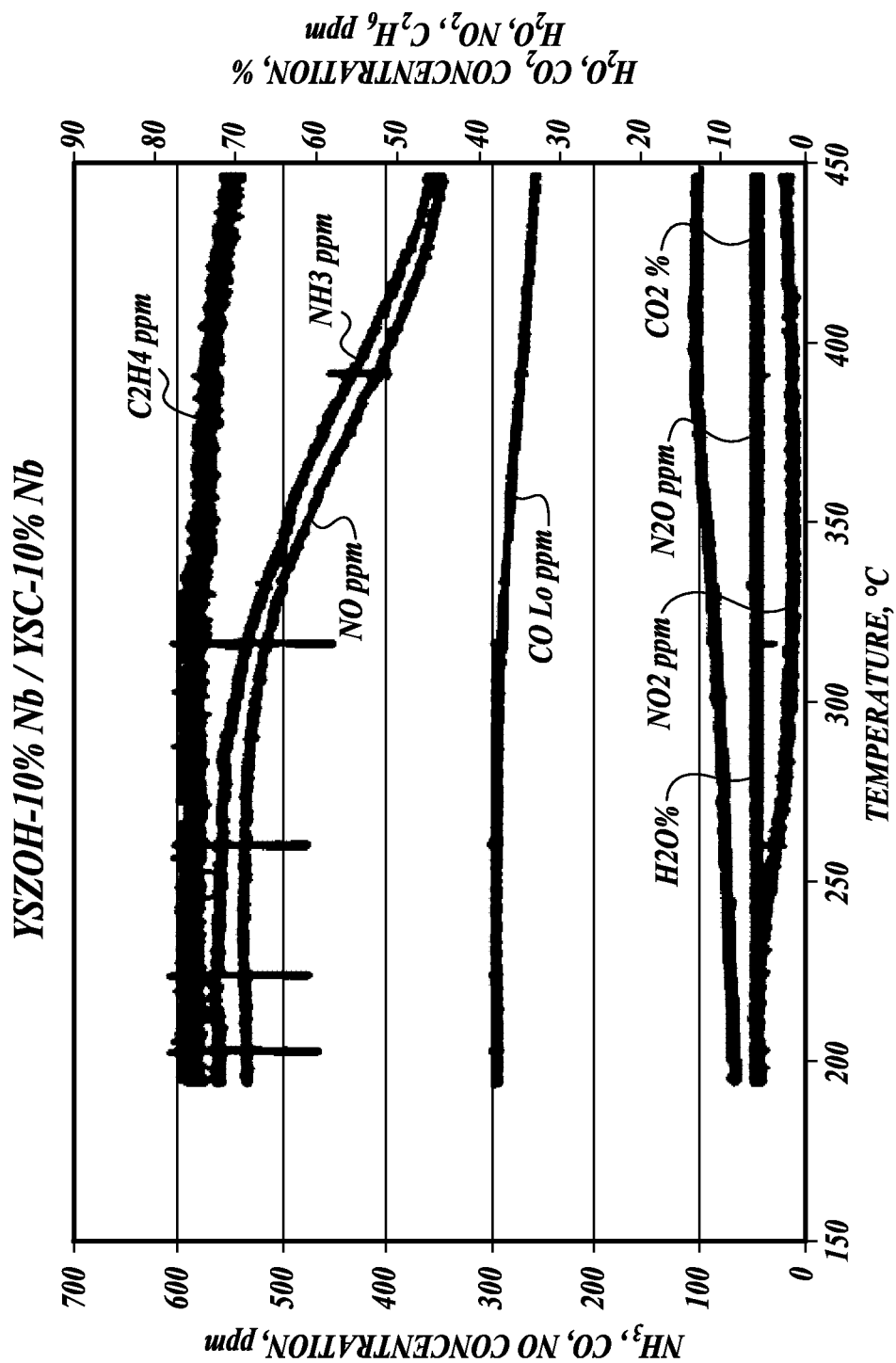
FIG. 4 is a graph showing the gas emission composition of a Nb-surface-modified YSZ/YSC.
Figure 5:
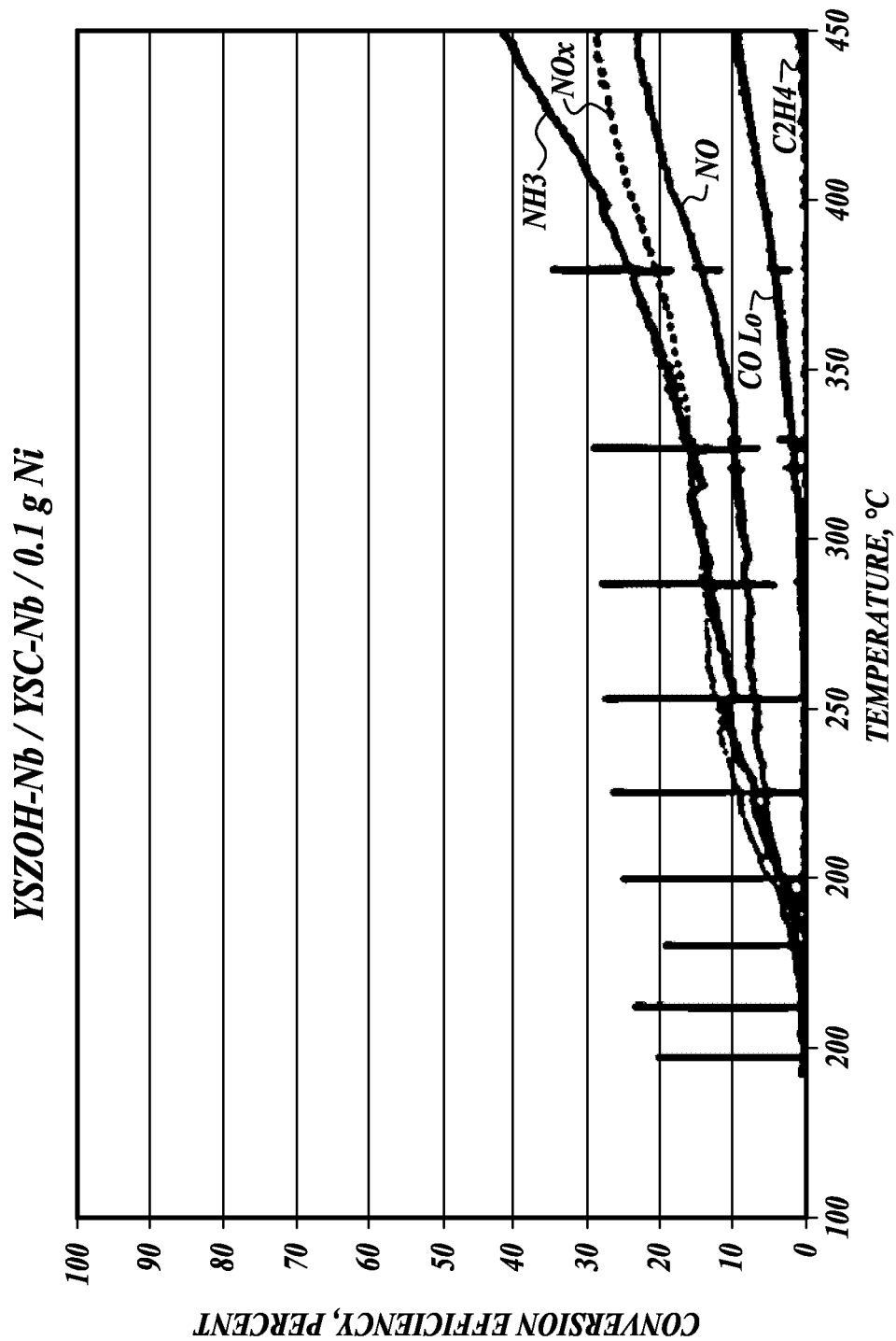
FIG. 5 is a graph showing the NOx conversion efficiency of a Nb-surface-modified YSZ/YSC containing 0.1 g absolute amount of Ni.
Figure 6:
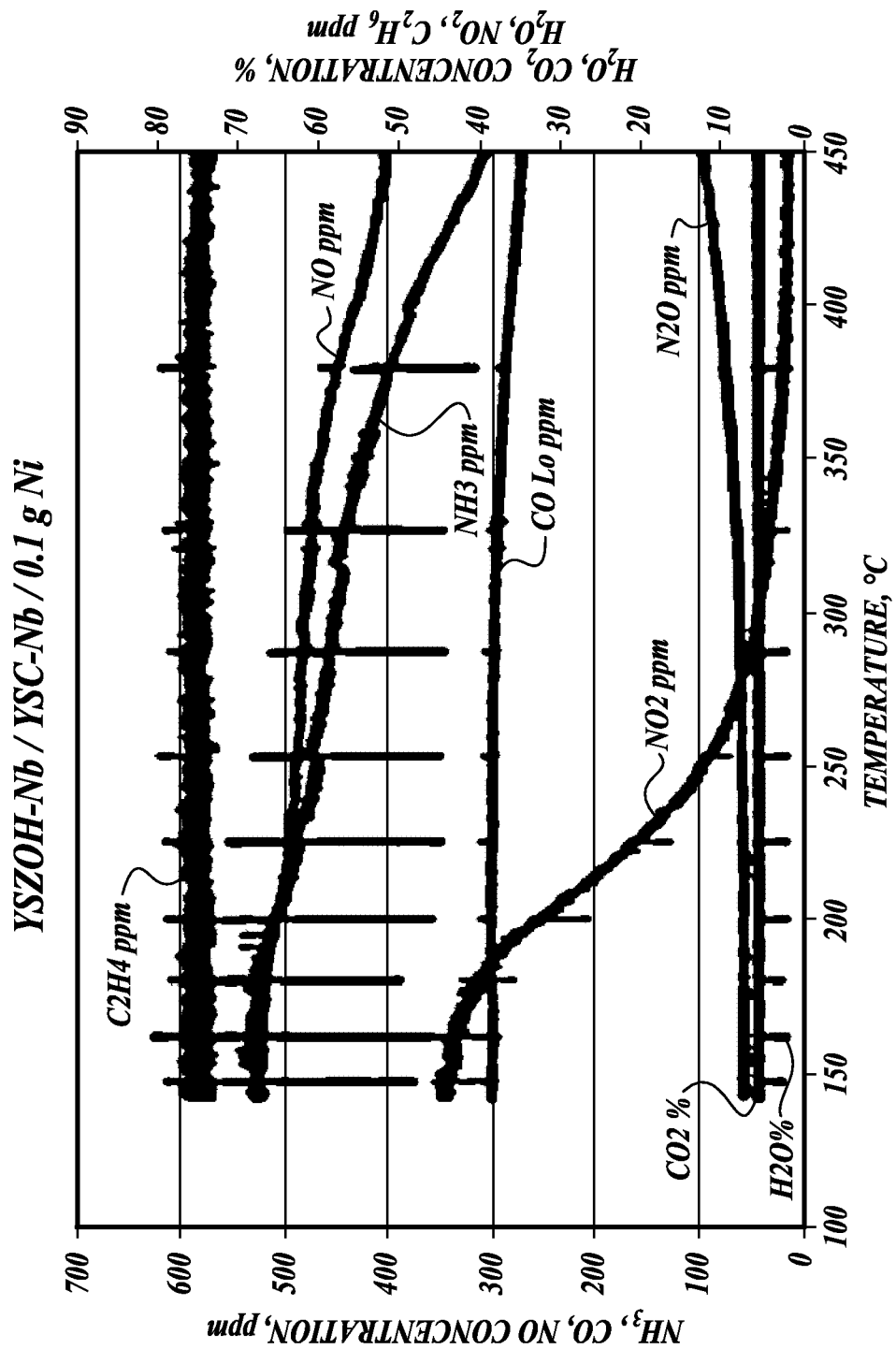
FIG. 6 is a graph showing the gas emission composition of a Nb-surface-modified YSZ/YSC containing 0.1 g absolute amount of Ni.
Figure 7:
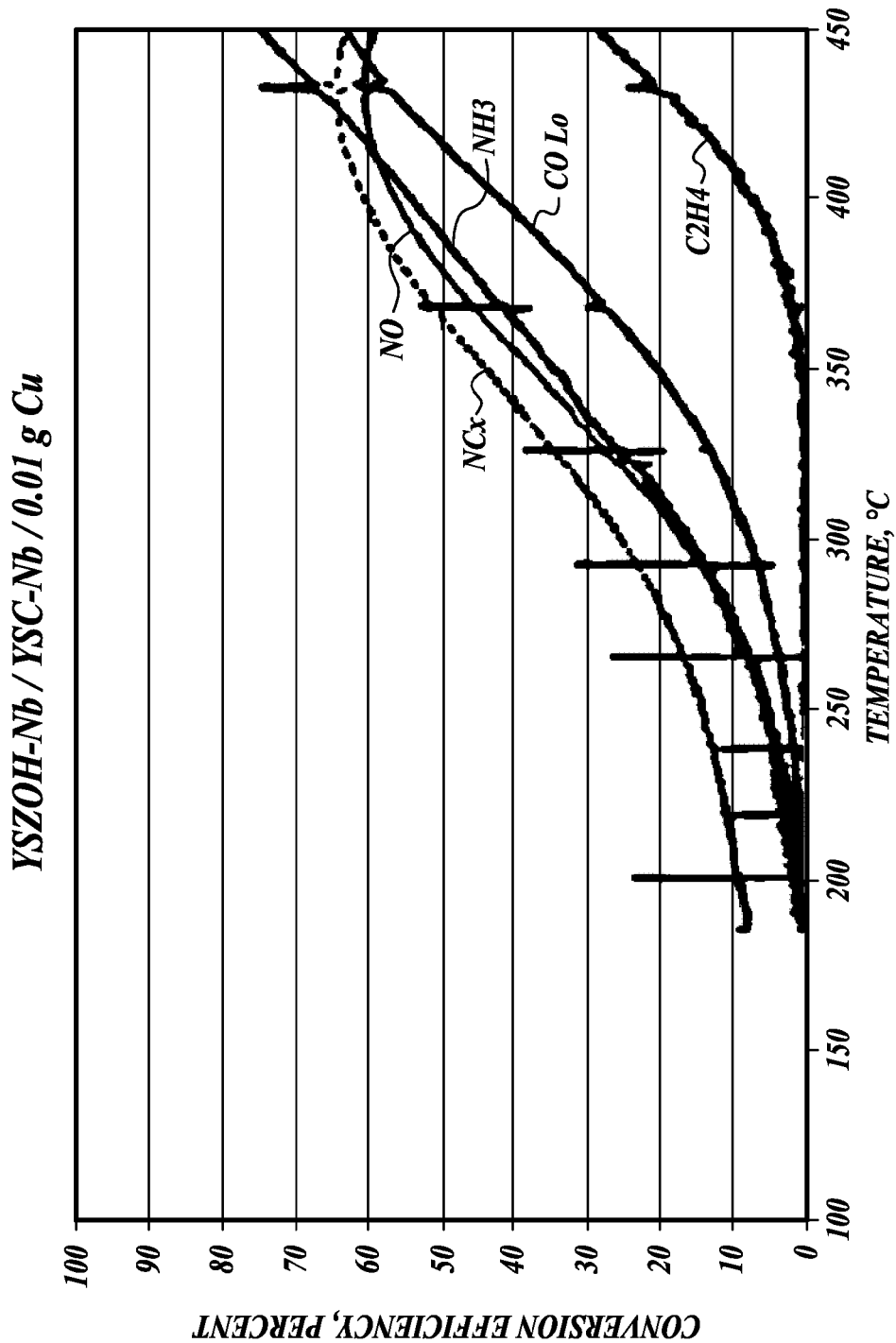
FIG. 7 is a graph showing the NOx conversion efficiency of a Nb-surface-modified YSZ/YSC containing 0.01 g absolute amount of Cu.
Figure 8:
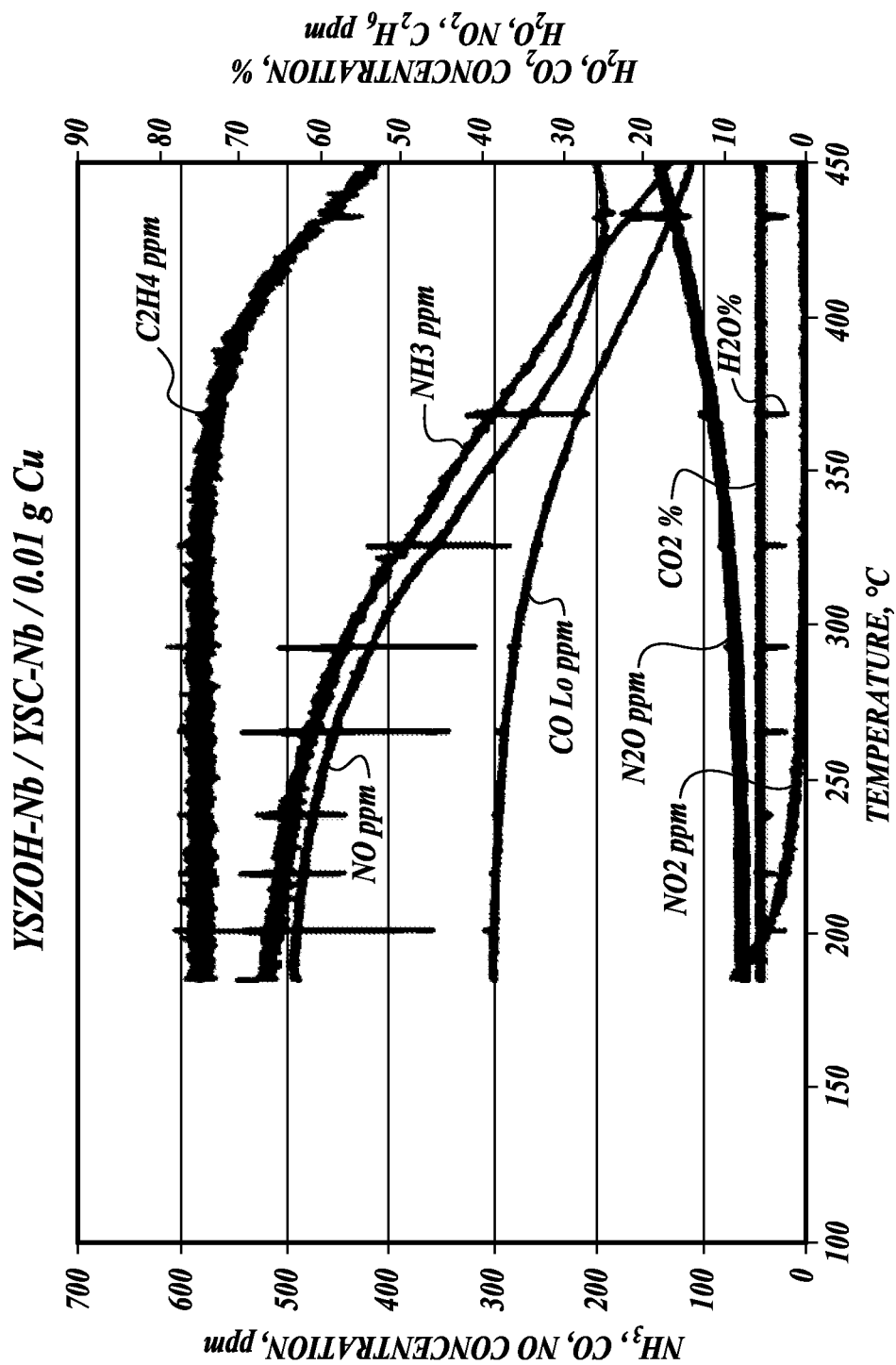
FIG. 8 is a graph showing the gas emission composition of a Nb-surface-modified YSZ/YSC containing 0.01 g absolute amount of Cu.
Figure 9:
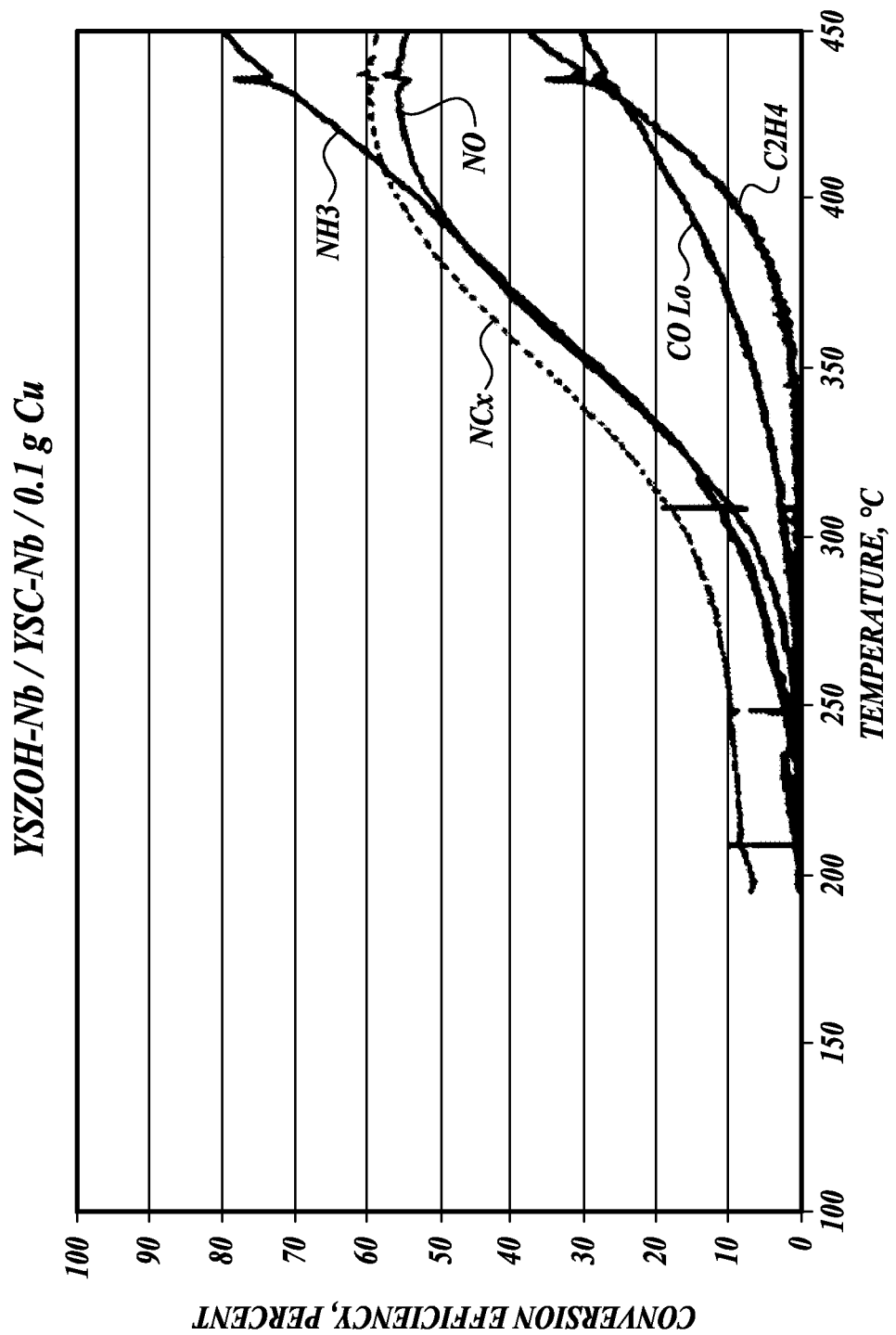
FIG. 9 is a graph showing the NOx conversion efficiency of a Nb-surface-modified YSZ/YSC containing 0.1 g absolute amount of Cu.
Figure 10:
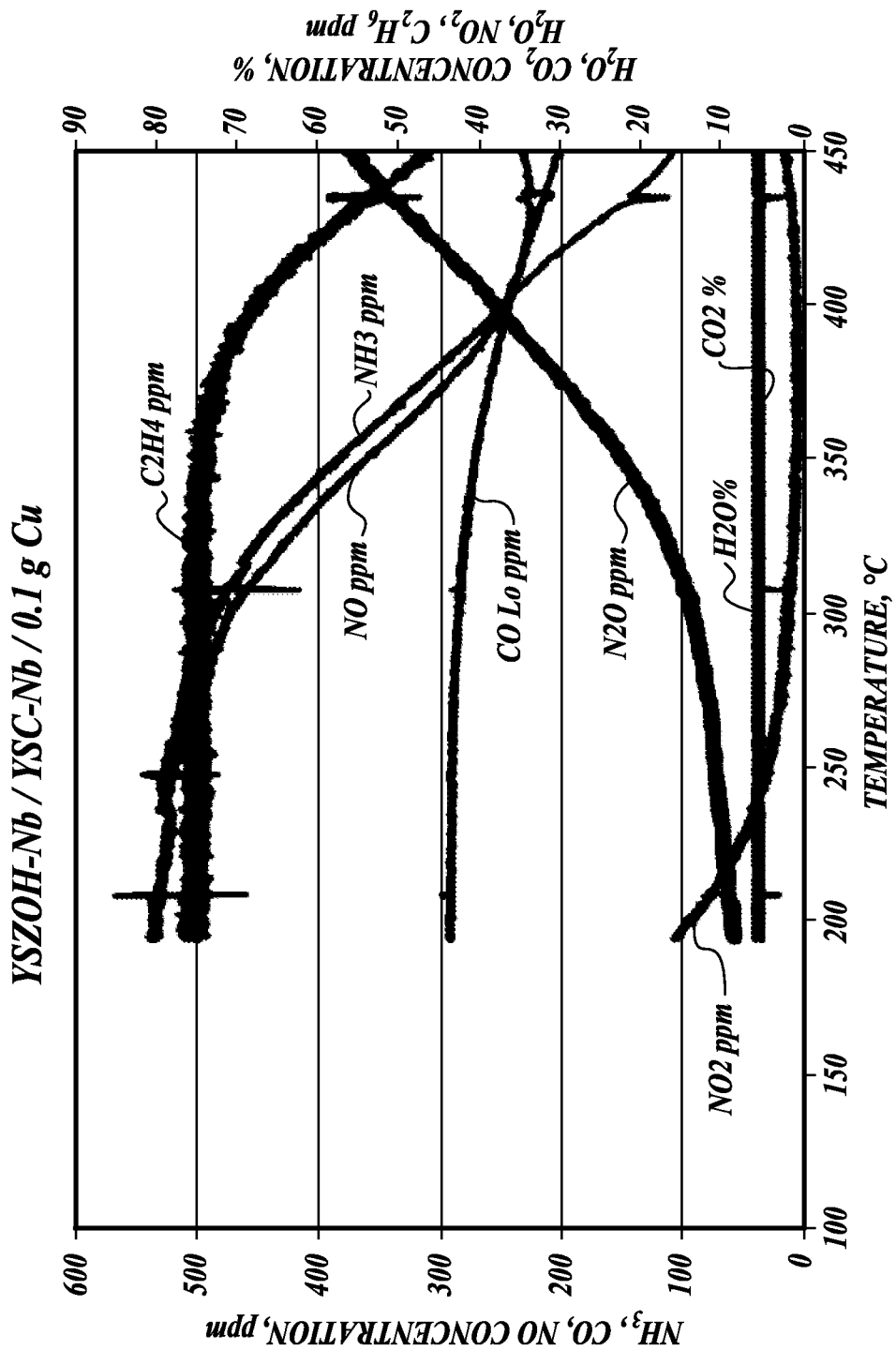
FIG. 10 is a graph showing the gas emission composition of a Nb-surface-modified YSZ/YSC containing 0.1 g absolute amount of Cu.

FIG. 2 is a graphical representation of the relative performance of a commercial DOC containing a platinum group metal (PGM) and a yttria stabilized ceria (YSC) NO$_2$-make catalyst of the present disclosure.

The preferred NO$_2$-make catalysts of the present disclosure are redox metal oxides that exhibit the least oxidative power, and as such will be the least likely to oxidize NH$_3$, while enabling subsequent reaction and stabilization of NO$_2$, thereby facilitating high NOx reduction in NO$_2$-depleted exhaust streams. Therefore, based upon the results of Example 1, the screened NO$_2$-make catalysts are preferred in the order: YSZ>YSC>>CeO$_2$—ZrO$_2$.

Example 2. Base Metal Modified Redox Metal Oxide Catalysts for Selective Catalytic Reduction and SCO Application Mixed redox metal oxide catalyst (1"×1") cordierite core samples (made according to U.S. Ser. No. 14/934,955, entitled "Surface-Modified Catalyst Precursors for Diesel Engine Aftertreatment Applications," filed concurrently with the present application and herein incorporated by reference in its entirety), washcoat composition equivalent to that employed in Example #1, and sample (YSZ-8/YSC-10) were used in this Example. In this composition, each of the redox metal oxide catalyst precursors was surface-modified with Nb (10% by weight). Washcoats were prepared from these surface-modified washcoats and core samples were tested for NRE according to the reverse light-off SCR (NO-free) protocol with the following gas stream composition: 600 ppm NO; 600 ppm NH$_3$; 75 ppm C$_2$H$_4$; 300 ppm CO; 10% O$_2$; 5.6% CO$_2$; 6% H$_2$O; balance N$_2$; and 40,000 GHSV.

Post-fabrication treatment of selected core samples with different amounts of either Cu or Ni salts, followed by calcining gave results shown in FIGS. 3-10. The data demonstrate that mixed redox metal oxide catalysts may be modified to facilitate a number of otherwise contradictory properties in an optimal way, including:
 (i) Enhancing NRE under NO$_2$-free conditions.
 (ii) When the core samples include Ni, both low temperature NRE and NH$_3$ storage over the entire temperature range are enhanced, while there is a slight decline in high temperature NRE.
 (iii) When the core samples include Cu, only high temperature NRE is enhanced.
 (iv) Ni markedly suppresses all oxidative processes including: hydrocarbon (HC), carbon monoxide (CO), and NH$_3$ (with reduced N$_2$O levels).
 (v) Cu by contrast exhibits a pronounced concentration-dependent increase in all oxidative processes, with NH$_3$ oxidation to N$_2$O being particularly dramatic.

Based on the data, Ni is a preferred cationic modifier for redox metal oxide catalysts.

Example 3. $NO_2$-Free Gas Stream Testing of High Performance SCR on DPF

This Example demonstrates that $NO_2$-make catalyst can be a key component in SCR catalyst when applied onto DPF substrates.

The following procedure was used to prepare and test a combination SCR catalyst washcoat on a (1"×3") Dinex Hi SiC DPF substrate.

Washcoat Procedure:
27% CuZSM-5 (from ACS as nanoZSM-5), 1.8% PEG-PPG, 10.8% NYACOL ZR 10/15, 0.8% PEG (300,000) and 58.9% DI water. Drying as conducted at 105° C. and calcining at 450° C. for 1 hr.

Standard Pretesting (Degreening) Procedure:
4 hr @ 600° C. with 10% $H_2O$ vapor.

NRE Test Procedure
This was done by the reverse light-off method with the following gas stream: 600 ppm NO; 600 ppm $NH_3$; 75 ppm $C_2H_4$; 300 ppm CO; 10% $O_2$; 5.6% $CO_2$; 6% $H_2O$; balance $N_2$; and 40,000 GHSV.

Figure 11:
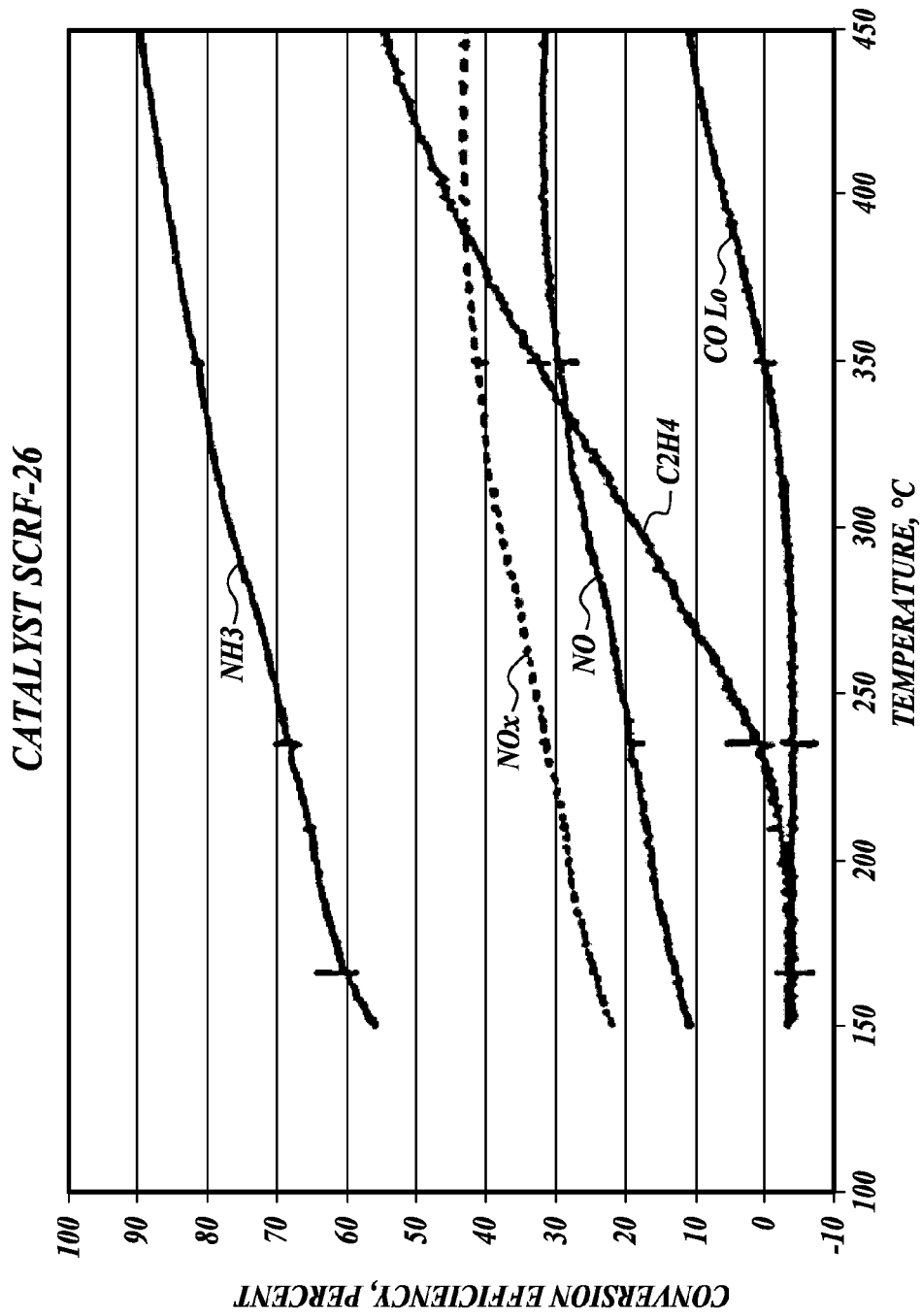
FIG. 11 is a graph showing the NOx conversion efficiency based upon a standard SCR reaction in a NO-only gas stream, using an embodiment of a SCR catalyst composition of the present disclosure.
Figure 12:
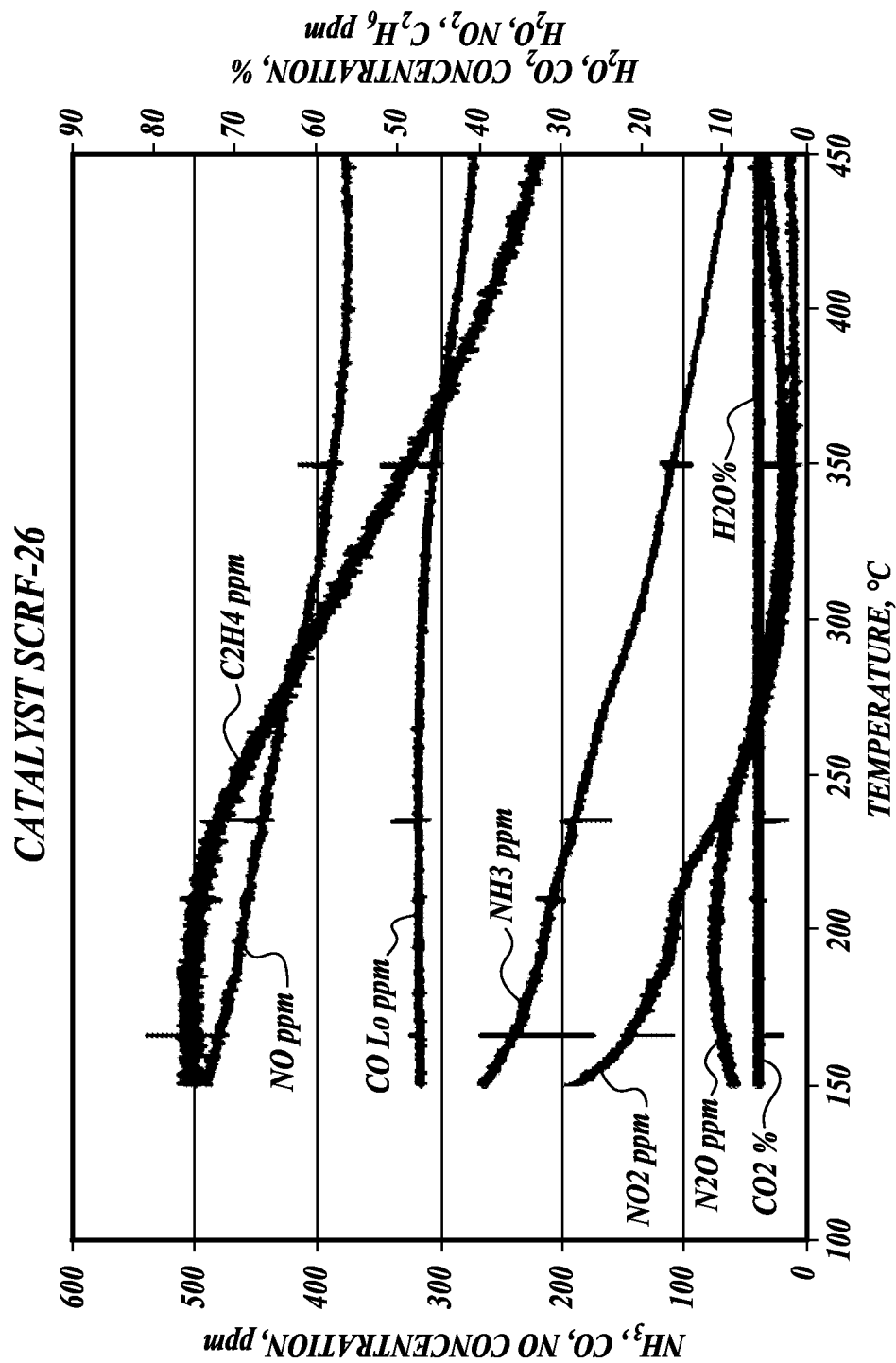
FIG. 12 is a graph showing the gas emission composition based upon a standard SCR reaction in a NO-only gas stream, using an embodiment of a SCR catalyst composition of the present disclosure.

The data in FIGS. 11 and 12 clearly demonstrate that:
(i) NRE in the absence of $NO_2$ occurs at a uniquely high level.
(ii) Furthermore, low temperature NRE is unparalleled by current state of the art SCR technology.
(iii) The low temperature is directly linked (at least in part) with high $NH_3$ storage; as illustrated by the difference between the $NH_3$ and NOx conversions in the data in the figure.
(iv) In addition, selective oxidation of HC and CO is at a very low level, and $NH_3$ is relatively unaffected (as determined by the relatively low $N_2O$ detected in the emissions gas.

FIG. 11 shows NOx reduction efficiencies in a NO-free gas stream. FIG. 12 shows the composition of the emission gas stream.

Example 4. $NO_2$/NOx Gas Stream Testing of High Performance SCR on DPF

NOx reduction efficiency (NRE) was determined using the following test procedure: $NO_2$/NOx=0.5, $NH_3$/NOx, 35,000 GHSV, 500 ppm NOx; $NH_3/NO_x$=1.

Results
These results illustrate the high performance capability of this technology in the SCRF format, where BASF applied Cu-chabazite on cordierite DPF from Corning was tested under identical conditions.
1. 50% lower SCR catalyst washcoat loading gave better performance for the catalyst composition at both low and high temperatures.
2. CuZSM-5 is no longer considered "state-of-the-art" for SCR applications, since the advent of chabazite, SAPO and other more improved zeolites.
3. The catalyst composition can include any type of zeolite, in any cationic form.

TABLE 3

Comparative NRE for Cu-Chabazite and Cu-based catalyst composition

| Feature | Binary Catalyst (Cu-ZSM-5/$ZrO_2$) | Cu-Chabazite |
|---|---|---|
| Catalyst Loading (g/L) | 75 | 150 |
| SCR Temperature (° C.) | | |
| 230 | 91% (NRE) | 80% (NRE) |
| 500 | 87% (NRE) | 75% (NRE) |

Example 5. Metal-Zeolite Catalysis Preparation

Both copper and iron forms of Nano-ZSM-5 zeolite catalysts were prepared from protonated form of the ZSM-5 zeolite (from ACS Materials), using 1M anhydrous copper sulfate or ferric chloride (respectively), in DI water. The mixture including the zeolite and the copper sulfate or the ferric oxide is stirred for 3 hours at 80° C., or alternatively for 18 hours at 80° C. The mixture was washed with DI water under vacuum via a Buchner funnel, dried at 120° C. for at least 1 hour, and calcined at 500° C. for 1 hr.

The resulting catalysts were analyzed by inductively coupled plasma mass spectrometry (ICP-MS) to determine the level of Cu and Fe loading. The catalysts were also applied to (1"×1") cordierite core samples and tested for NRE.

The results are shown in Table 4, where the relatively low Cu loading by ion exchange was preferred. This is in spite of using a 1M $CuSO_4$ (i.e., $29\times10^3$ ppm $Cu^{2+}$) solution initially for ion exchange.

Cu loading in ZSM-5 has traditionally been preferred at moderate to very high concentrations, from about 3% to well over 100%. In contrast, this disclosure seeks to obtain low to moderate Cu loading, as dictated by the maximum ion exchange level (based upon the initial Cu ion concentration in the starting reagent). In this way, it is possible to maximize the amount of Cu residing in the zeolite cage (or pore) active sites, while minimize the Cu species at other locations that do not directly contribute to the NRE. Furthermore, Cu species in locations other than the zeolite active sites for NRE tend to contribute to undesirable side reactions (e.g., $NH_3$ oxidation to produce increased $N_2O$ emissions).

Figure 13A:
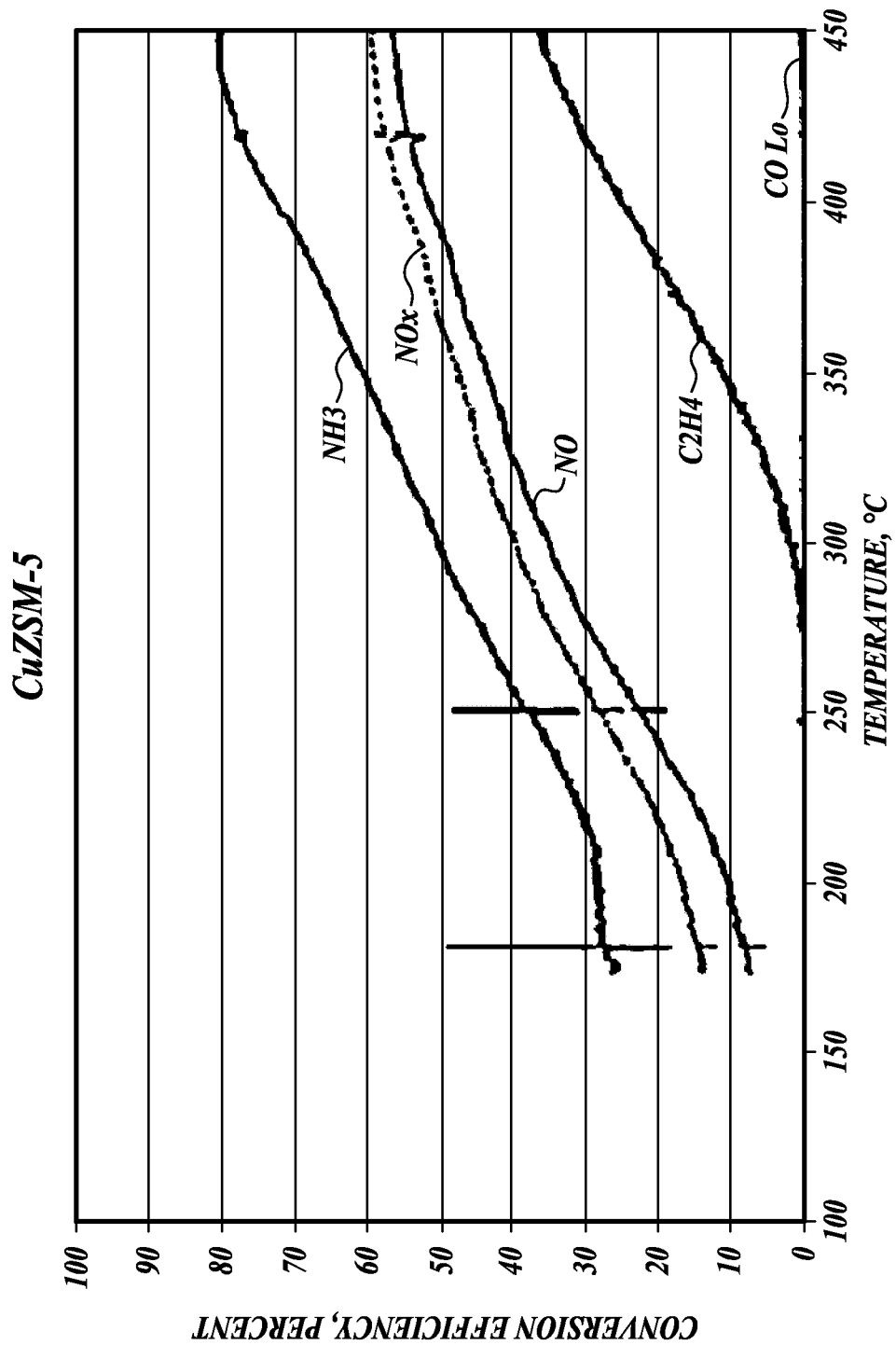
FIGS. 13A and 13B are graphs showing the NOx conversion efficiency (FIG. 13A) and gas emission composition (FIG. 13B) of a metal zeolite catalyst of the present disclosure.
Figure 13B:
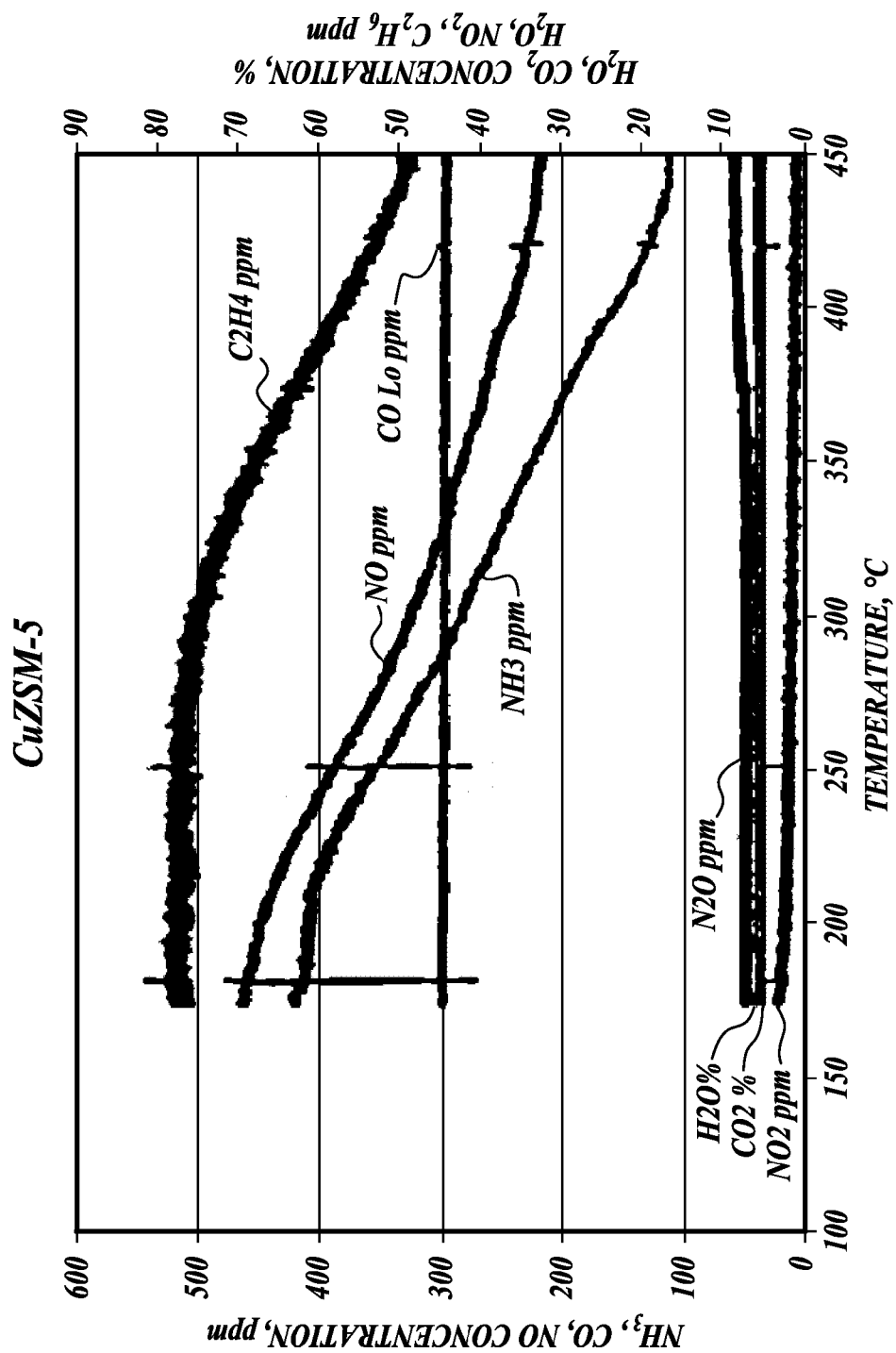

Sample 1 in Table 4 was washed with about 50% less DI water than samples 2-5, to minimize potential extraction of ion exchanged Cu from the zeolite active sites. In addition, it was assumed that the trace amount of residual Cu species not residing in the zeolite active sites for NRE would become intimately associated with the redox metal oxide in a SCR catalyst composition's washcoat to facilitate the advantageous metal ion activation demonstrated in Example 2. NRE properties of this catalyst (Sample 1) under reverse SCR light-off test conditions (in the absence of $NO_2$) are shown in FIGS. 13A and 13B.

Figure 14A:
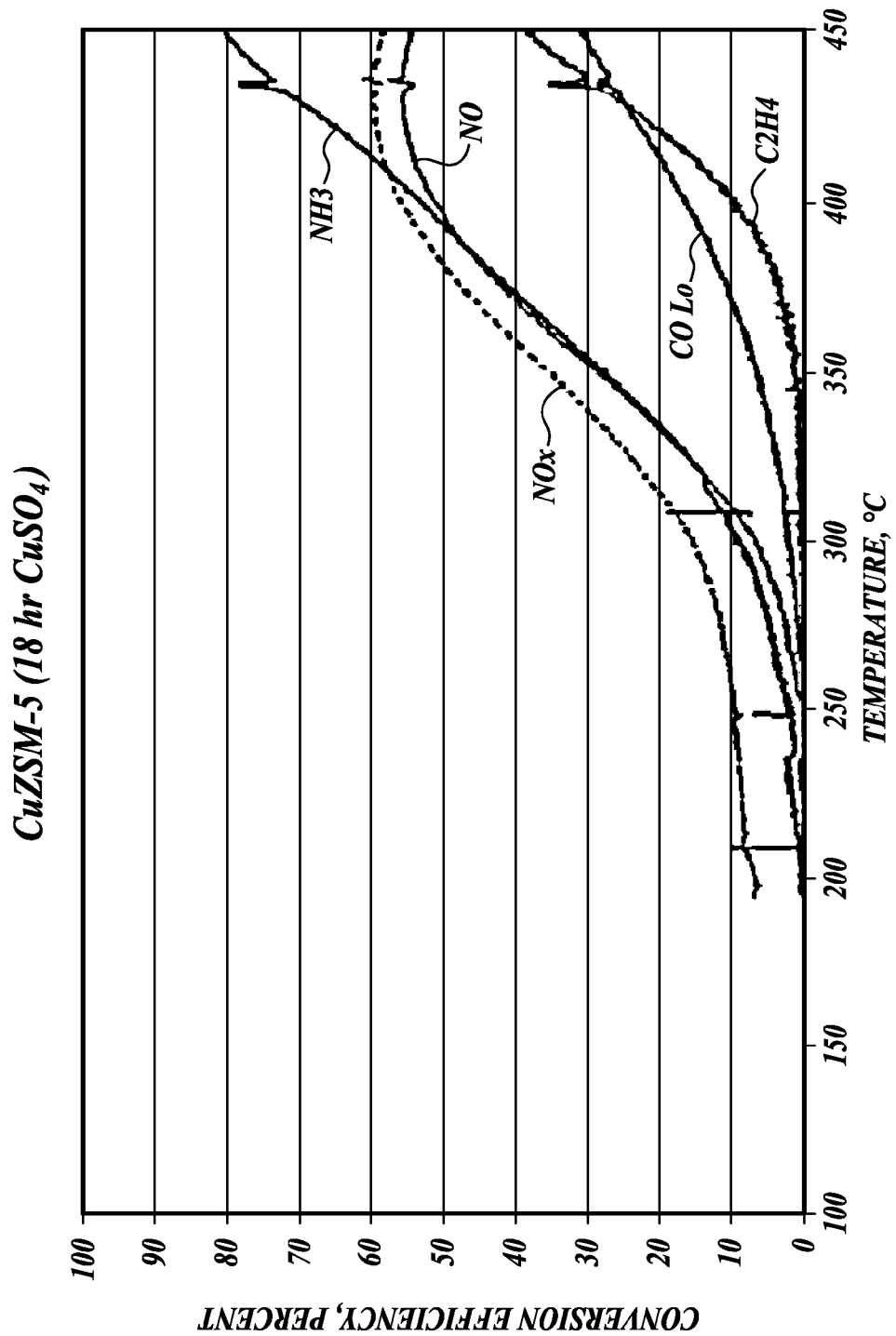
FIGS. 14A and 14B are graphs showing the NOx conversion efficiency (FIG. 14A) and gas emission composition (FIG. 14B) of a metal zeolite catalyst of the present disclosure.
Figure 14B:
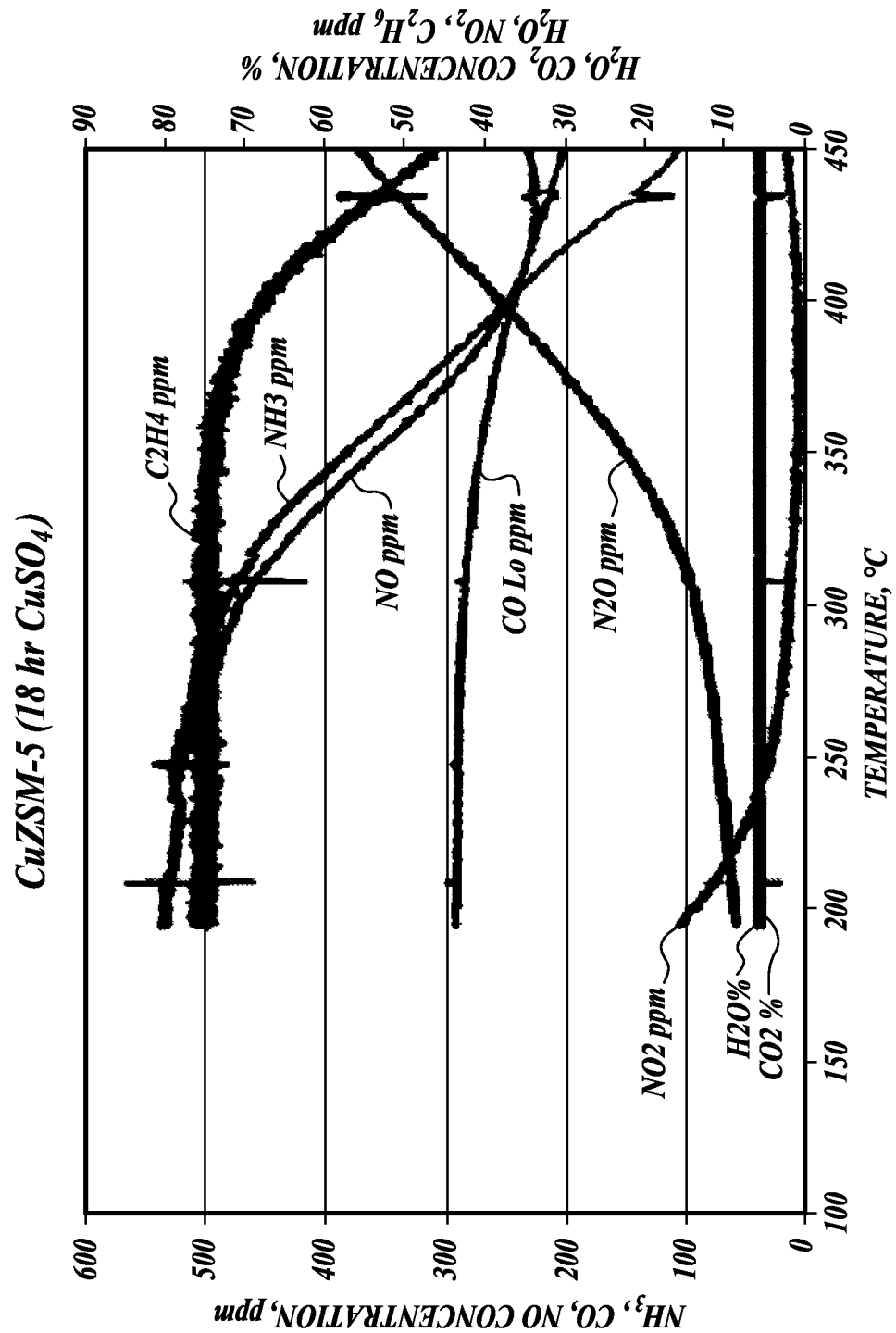

Sample 2 in Table IV was stirred for 18 hours at 80° C. to maximize the amount of Cu ion exchange. However, the NRE results for this catalyst in FIGS. 14A and 14B are markedly inferior to that of sample 1 (FIGS. 13A and 13B) in the following ways: Sample 2 exhibits lower Cu loading (see, Table 4); lower $NH_3$ storage at both low and high temperatures; lower NRE at low and moderate temperatures; an increase in all monitored oxidative processes (i.e., oxidation of $NH_3$, hydrocarbon, and carbon monoxide); and a dramatic increase in $N_2O$ emissions (by ~600% at 450° C.).

These results suggest effective ion exchange is complete within 3 hrs at 80° C., and that further exposures to ion exchange conditions may not be desirable.

Sample 6 in Table IV was prepared by under equivalent conditions to that for sample 1, except that 1M ferric chloride was used for the ion exchange process.

TABLE 4

Cation Loading of Nano-ZSM-5 by Ion Exchange from 1M Solutions (3 hrs at 80° C., samples 1, and 3-6) and (18 hrs at 80° C., sample 2), determined by inductively coupled plasma mass spectrometry (ICP-MS).

| Sample # | Fe (wt %) | Cu (wt %) |
|---|---|---|
| 1 | 0 | 0.84 |
| 2 | 0 | 0.3 |
| 3 | 0 | 0.19 |
| 4 | 0 | 0.23 |
| 5 | 0 | 0.21 |
| 6 | 2 | 0 |

While illustrative embodiments have been illustrated and described, it will be appreciated that various changes can be made therein without departing from the spirit and scope of the invention.

The embodiments of the invention in which an exclusive property or privilege is claimed are defined as follows:

1. A selective catalytic reduction catalyst composition, comprising:
   a metal oxide catalyst; and
   from 50 wt % to 98 wt % by weight of a metal doped zeolite catalyst,
   wherein the catalyst composition increases a conversion efficiency of nitrogen oxides to nitrogen and water by at least 2% compared to the metal oxide catalyst alone or the metal doped zeolite catalyst alone.

2. The catalyst composition of claim 1, wherein the metal oxide catalyst is selected from cerium oxide, titanium oxide, zirconium oxide, aluminum oxide, silicon oxide, hafnium oxide, vanadium oxide, niobium oxide, tantalum oxide, chromium oxide, molybdenum oxide, tungsten oxide, ruthenium oxide, rhodium oxide, iridium oxide, nickel oxide, barium oxide, yttrium oxide, scandium oxide, calcium oxide, manganese oxide, chromium oxide, lanthanum oxide, strontium oxide, cobalt oxide, and any combination thereof.

3. The catalyst composition of claim 1, wherein the metal oxide catalyst is selected from the group consisting of titanium oxide, zirconium oxide, cerium oxide, and any combination thereof.

4. The catalyst composition of claim 1, wherein the metal oxide catalyst further comprises a cationic dopant.

5. The catalyst composition of claim 4, wherein the cationic dopant is an oxide selected from the group consisting of $Mg^{2+}$, $Cu^{2+}Cu^{+}$, $Ni^{2+}$, $Ti^{4+}$, $V^{4+}$, $Nb^{4+}$, $Ta^{5+}$, $Cr^{3+}$, $Mo^{3+}$, $W^{6+}$, $W^{3+}$, $Mn^{2+}$, $Fe^{3+}$, $Zn^{2+}$, $Ga^{3+}$, $Al^{3+}$, $In^{3+}$, $Ge^{4+}$, $Si^{4+}$, $Co^{2+}$, $Ni^{2+}$, $Ba^{2+}$, $La^{3+}$, $Ce^{4+}$, and $Nb^{5+}$ and $Sr^{2+}$.

6. The catalyst composition of claim 5, wherein the cationic dopant is present in an amount of between about 0.001 mol % to 40 mol % in the metal oxide catalyst.

7. The catalyst composition of claim 4, wherein the cationic dopant is selected from $Y^{3+}$, $Sc^{3+}$, and $Ca^{2+}$.

8. The catalyst composition of claim 7, wherein the cationic dopant is present in an amount of between about 0.001 mol % to 40 mol % in the metal oxide catalyst.

9. The catalyst composition of claim 1, wherein the metal oxide is selected from yttria-stabilized zirconia, yttria-stabilized ceria, and a combination thereof.

10. The catalyst composition of claim 1, wherein the metal oxide further comprises a metal element on a surface of the metal oxide.

11. The catalyst composition of claim 10, wherein the metal element is selected from Nb, Ca, Sc, Ti, V, Cr, Mn, Fe, Co, Ni, Cu, Y, Zr, Ru, Rh, Pd, Pt, Ag, Ba, W, La, Ce, Ta, Mo, Al, Si, Ge, Ir, Os, Re, Pt, and any combination thereof.

12. The catalyst composition of claim 1, wherein the metal doped zeolite catalyst is selected from Fe-doped aluminosilicate zeolites, Cu-doped aluminosilicate zeolites, Fe and Cu-doped aluminosilicate zeolites, Fe-doped silico-alumino-phosphate zeolites, Cu-doped silico-alumino-phosphate zeolites, and Fe and Cu-doped silico-alumino-phosphate zeolites.

13. The catalyst composition of claim 1, wherein the Cu is present in an amount of between about 0.01 wt % to 5 wt % in the metal doped zeolite catalyst.

14. The catalyst composition of claim 1, wherein the Fe is present in an amount of between about 0.01 wt % to 5 wt % in the metal doped zeolite catalyst.

15. The catalyst composition of claim 1, comprising from 2 wt % to 50 wt % by weight of the metal oxide catalyst.

16. The catalyst composition of claim 1, having a 50% CO to $CO_2$ conversion temperature of 500° C. or more.

17. The catalyst composition of claim 1, having a 50% NO to $NO_2$ conversion temperature of 500° C. or more.

18. The catalyst composition of claim 1, having a 50% $C_2H_4$ to $CO_2$ and $H_2O$ conversion temperature of 500° C. or more.

19. The catalyst composition of claim 1, wherein the composition is supported by a support structure selected from a ceramic monolith and a metallic substrate.

20. A method of reducing NOx in diesel engine exhaust in a selective catalytic reduction system, comprising:
    exposing a NOx-containing diesel engine exhaust to a catalyst composition of claim 1,
    wherein the catalyst composition is disposed on or within a catalyst support structure.

21. The method of claim 20, wherein the catalyst support structure is selected from a ceramic monolith and a metallic substrate.

22. The method of claim 20, wherein the catalyst composition increases $NH_3$ storage at below 250° C. compared to the metal oxide catalyst alone or the metal doped zeolite catalyst alone, when present in the catalyst composition.

23. The method of claim 20, wherein the catalyst composition is capable of decomposing urea deposits.

24. There method of claim 20, wherein the catalyst composition has a lower water uptake and a higher water desorption rate compared to the metal oxide catalyst alone or the metal doped zeolite catalyst alone, when present in the catalyst composition.

25. The method of claim 20, wherein the catalyst composition increases NOx storage capability under low engine out NOx conditions.

* * * * *

UNITED STATES PATENT AND TRADEMARK OFFICE
CERTIFICATE OF CORRECTION

Page 1 of 1

PATENT NO. : 9,757,691 B2
APPLICATION NO. : 14/935048
DATED : September 12, 2017
INVENTOR(S) : R. A. Goffe It is certified that error appears in the above-identified patent and that said Letters Patent is hereby corrected as shown below:

| Column | Line | |
|---|---|---|
| 17 Claim 5 | 56 | "and $Nb^{5+}$" should read --$Nb^{5+}$-- |

Signed and Sealed this
Fourth Day of June, 2019

Andrei Iancu
*Director of the United States Patent and Trademark Office*